United States Patent
Decker et al.

(10) Patent No.: US 10,994,853 B2
(45) Date of Patent: *May 4, 2021

(54) TILTROTOR AIRCRAFT ROTATING PROPROTOR ASSEMBLY

(71) Applicant: Bell Helicopter Textron Inc., Fort Worth, TX (US)

(72) Inventors: George R. Decker, Mansfield, TX (US); Steve Robedeau, Keller, TX (US); Jeffrey M. Williams, Hudson Oaks, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/127,115

(22) Filed: Sep. 10, 2018

(65) Prior Publication Data

US 2019/0092485 A1    Mar. 28, 2019

Related U.S. Application Data

(63) Continuation-in-part of application No. 15/661,129, filed on Jul. 27, 2017, which is a continuation-in-part
(Continued)

(51) Int. Cl.
  *B64D 29/06*    (2006.01)
  *B64C 29/00*    (2006.01)

(52) U.S. Cl.
  CPC .......... *B64D 29/06* (2013.01); *B64C 29/0033* (2013.01)

(58) Field of Classification Search
  CPC .......... B64D 29/06; B64D 29/02; B64C 7/02; B64C 29/0033
  See application file for complete search history.

(56) References Cited

U.S. PATENT DOCUMENTS 2,921,146 A    1/1960    Ericson
3,392,244 A    7/1968    Hillmann
(Continued)

FOREIGN PATENT DOCUMENTS

EP    2497402 A2    9/2012
EP    3369654 A1    9/2018
(Continued)

OTHER PUBLICATIONS

EP Invitation pursuant to Rule 62a(1) EPC, dated Oct. 1, 2019, by the EPO, re EP Patent App No. 19192072.7.
(Continued)

*Primary Examiner* — Brian M O'Hara
*Assistant Examiner* — Keith L Dixon
(74) *Attorney, Agent, or Firm* — Timmer Law Group, PLLC

(57) ABSTRACT

A door system for a nacelle of a tiltrotor aircraft, the nacelle including a movable proprotor housing rotatable relative to a fixed portion of the nacelle from a forward flight mode to a vertical flight mode and a proprotor gearbox door connected to the movable proprotor housing and pivotably coupled to the fixed portion. The door system including a linkage to pivotably couple the door and the fixed portion of the nacelle; a track assembly mounted to the movable proprotor housing; and a door roller mechanism connected to the proprotor gearbox door. The door roller mechanism traverses the track assembly during rotation of the movable proprotor housing.

21 Claims, 35 Drawing Sheets

Related U.S. Application Data of application No. 15/448,415, filed on Mar. 2, 2017, and a continuation-in-part of application No. 15/448,136, filed on Mar. 2, 2017.

(56) References Cited

U.S. PATENT DOCUMENTS

| | | | |
|---|---|---|---|
| 3,666,209 A | | 5/1972 | Taylor |
| 4,037,809 A | | 7/1977 | Legrand |
| 4,172,423 A | | 10/1979 | Monne |
| 5,395,073 A | * | 3/1995 | Rutan ............... B64C 3/385 244/38 |
| 5,863,013 A | * | 1/1999 | Schmittle ........... B64C 3/385 244/104 LS |
| 6,098,342 A | | 8/2000 | Bischof et al. |
| 6,260,793 B1 | * | 7/2001 | Balayn .............. B64C 7/00 244/130 |
| 6,382,556 B1 | * | 5/2002 | Pham ............... B64C 27/28 244/6 |
| 6,974,105 B2 | * | 12/2005 | Pham ............... B64C 27/26 244/12.4 |
| 7,143,973 B2 | * | 12/2006 | Ballew ............. B64C 27/10 244/6 |
| 8,066,219 B2 | * | 11/2011 | Patt ................ B64C 27/463 244/12.4 |
| 8,757,546 B2 | | 6/2014 | Porte et al. |
| 9,126,678 B2 | | 9/2015 | Ross et al. |
| 9,174,731 B2 | | 11/2015 | Ross et al. |
| 9,199,732 B2 | | 12/2015 | Isaac et al. |
| 10,106,255 B2 | * | 10/2018 | Covington ....... B64C 29/0033 |
| 10,533,603 B2 | * | 1/2020 | Pravanh ............ B64D 29/02 |
| 10,539,180 B2 | | 1/2020 | Pravanh et al. |
| 10,875,627 B2 | | 12/2020 | Kurikesu et al. |
| 2001/0037613 A1 | | 11/2001 | Owens |
| 2005/0045762 A1 | | 3/2005 | Pham |
| 2008/0066259 A1 | | 3/2008 | Prieur |
| 2009/0307981 A1 | | 12/2009 | Loidolt |
| 2010/0059628 A1 | | 3/2010 | Kobayashi et al. |
| 2011/0089714 A1 | * | 4/2011 | Kitayama ........... B60J 5/06 296/155 |
| 2015/0165759 A1 | | 6/2015 | Landa et al. |
| 2018/0251227 A1 | | 9/2018 | Ross |
| 2018/0252263 A1 | | 9/2018 | Pravanh et al. |
| 2018/0252264 A1 | | 9/2018 | Pravanh et al. |
| 2019/0337606 A1 | | 11/2019 | Kurikesu |

FOREIGN PATENT DOCUMENTS

| | | | |
|---|---|---|---|
| EP | 3369659 A1 | | 9/2018 |
| EP | 3378767 A1 | | 9/2018 |
| EP | 3369659 B1 | | 1/2019 |
| EP | 3378767 B1 | | 1/2019 |
| EP | 3369654 B1 | | 10/2019 |
| EP | 3626612 A1 | | 3/2020 |
| FR | 2892142 A1 | | 4/2007 |
| FR | 2010-A84173 | * | 7/2009 ............... B64C 1/14 |

OTHER PUBLICATIONS

EP Search Report, dated Feb. 27, 2018, by the EPO, re EP Patent App No. 17197649.1.
EP Exam Report, dated Mar. 12, 2018, by the EPO, re EP Patent App No. 17197649.1.
Invitation pursuant to Rule 62a(1) EPC, dated Mar. 1, 2018, by the EPO, re EP Patent App No. 17197811.7.
Partial EP Search Report, dated May 2, 2018, by the EPO, re EP Patent App No. 17197811.7.
EP Exam Report, dated May 25, 2018, by the EPO, re EP Patent App No. 17197811.7.
EP Search Report, dated Feb. 27, 2018, by the EPO, re EP Patent App No. 17197812.5.
EP Exam Report, dated Mar. 12, 2018, by the EPO, re EP Patent App No. 17197812.5.
Canadian Office Action, dated Oct. 1, 2018, by the CIPO, re CA Patent App No. 2,986,741.
EP Communication under Rule 71(3) EPC—Intention to Grant, dated Sep. 28, 2018, by the EPO, re EP Patent App No. 17197649.1.
EP Communication under Rule 71(3) EPC—Intention to Grant, dated Oct. 10, 2018, by the EPO, re EP Patent App No. 17197812.5.
EP Exam Report, dated Nov. 19, 2018, by the EPO, re EP Patent App No. 17197811.7.
EP Decision to Grant, dated Dec. 6, 2018, by the EPO, re EP Patent App No. 17197649.1.
EP Decision to Grant, dated Dec. 6, 2018, by the EPO, re EP Patent App No. 17197812.5.
Communication under Rule 71(3) EPC—Intention to Grant, dated May 23, 2019, by the EPO, re EP Patent Application No. 17197811.7.
Office Action, dated Jun. 17, 2019, by the USPTO, re U.S. Appl. No. 15/448,415.
Office Action, dated Jun. 17, 2019, by the USPTO, re U.S. Appl. No. 15/448,136.
CA Office Action, dated Jul. 23, 2019, by the CIPO, re CA Patent App No. 2,986,741.
Notice of Allowance, dated Oct. 2, 2019, by the USPTO, re U.S. Appl. No. 15/448,136.
Notice of Allowance, dated Oct. 3, 2019, by the USPTO, re U.S. Appl. No. 15/448,415.
CA Notice of Allowance, dated Apr. 23, 2020, by the CIPO, re CA App No. 2,986,741.
EP Search Report, dated Feb. 20, 2020, by the EPO re EP Patent App No. 19192072.7.
Ep Exam Report, dated Mar. 31, 2020, by the EPO, re EP App No. 19192072.7.
Office Action, dated Jul. 10, 2020, by the USPTO, re U.S. Appl. No. 15/661,129.
Office Action-Restriction, dated Aug. 3, 2020, by the USPTO, re U.S. Appl. No. 15/968,649.
Notice of Allowance, dated Oct. 23, 2020, by the USPTO, re U.S. Appl. No. 15/968,649.
Communication under Rule 71(3) EPC—Intention to Grant, dated Oct. 8, 2020, by the EPO, re EP Application No. 19192072.7.

* cited by examiner

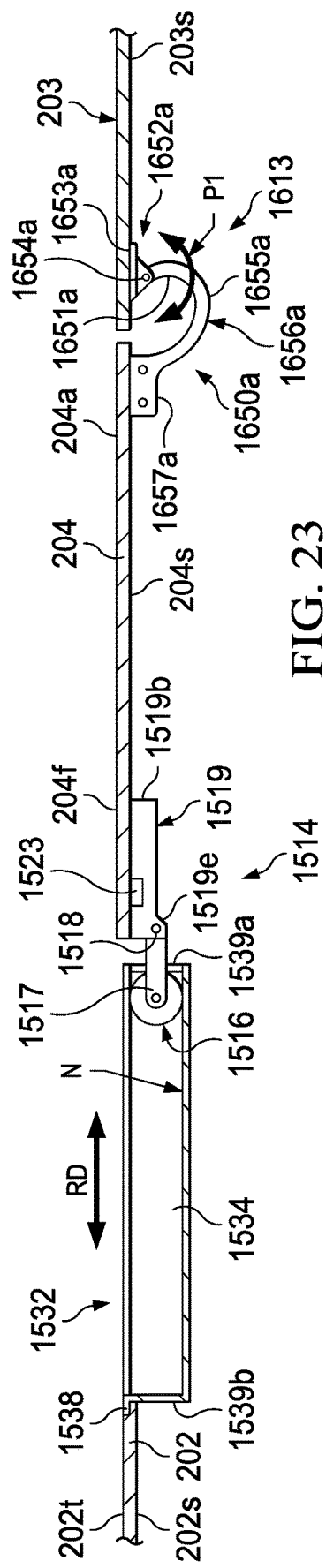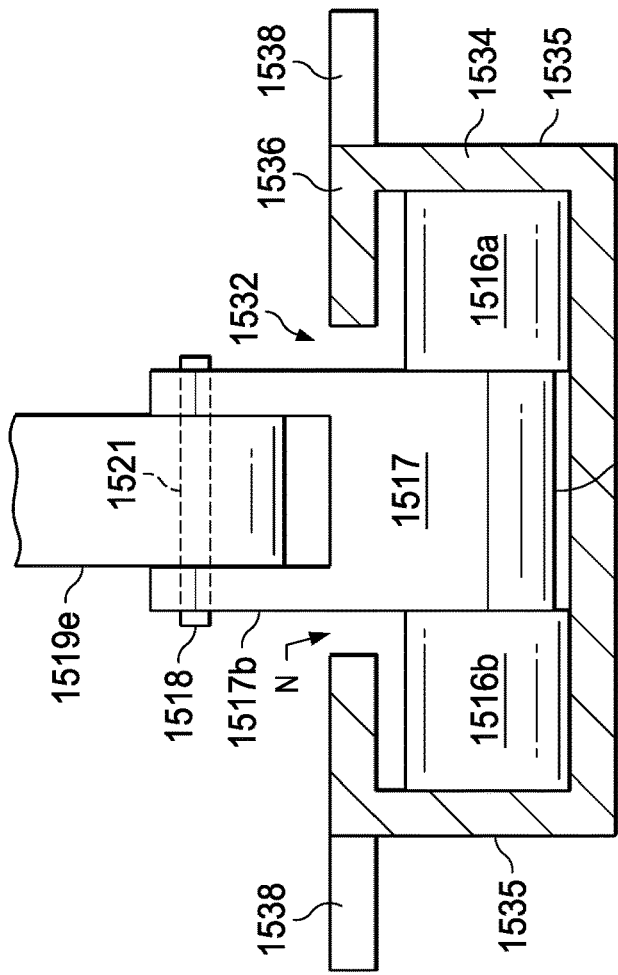
FIG. 23
FIG. 24

TILTROTOR AIRCRAFT ROTATING PROPROTOR ASSEMBLY

CROSS-REFERENCE TO RELATED APPLICATIONS

This application claims priority to and is a continuation-in-part of U.S. patent application Ser. No. 15/661,129, filed Jul. 27, 2017, which is a continuation-in-part of U.S. patent application Ser. No. 15/448,415, filed Mar. 2, 2017, and U.S. patent application Ser. No. 15/448,136, filed Mar. 2, 2017. Each patent application identified above is incorporated herein by reference in its entirety.

BACKGROUND

Technical Field

The present disclosure relates to an aircraft, and more particularly, to a tiltrotor aircraft having a rotating proprotor assembly.

Description of Related Art

Certain tiltrotor aircraft, such as the Bell Helicopter Valor V-280 tiltrotor aircraft, employ a propulsion system on a wing member with a fixed nacelle that encloses an engine and a movable (rotatable) proprotor gearbox (PRGB) system that drives the rotor blades. The PRGB system is rotatable relative to the nacelle to convert between a vertical flight mode and a forward flight mode and vice versa. In operation, as the rotation of the PRGB can cause at least one of the following issues: unwanted vibrations transmitted from the PRGB to other aircraft components and create a space behind the rotation axis of the PRGB during the transition to the vertical flight mode and during the flight mode that interrupts the aerodynamic profile of the nacelle propulsion system. Therefore, there what is needed is an apparatus that addresses one or more of the foregoing issues, and/or one or more other issues.

SUMMARY

In a first aspect, there is a door system for a nacelle of a tiltrotor aircraft, the nacelle including a movable proprotor housing rotatable relative to a fixed portion of the nacelle from a forward flight mode to a vertical flight mode and a proprotor gearbox door connected to the movable proprotor housing and pivotably coupled to the fixed portion. The door system including a linkage to pivotably couple the door and the fixed portion of the nacelle; a track assembly mounted to the movable proprotor housing; and a door roller mechanism connected to the proprotor gearbox door; wherein the door roller mechanism traverses the track assembly during rotation of the movable proprotor housing.

In an embodiment, the linkage includes of at least one hinge member.

In another embodiment, the at least one hinge member is a pair of hinge members.

In an exemplary embodiment, the at least one hinge member includes a first end disposed on a stationary surface of the fixed portion of the nacelle and a second end opposite from the first end disposed on the door.

In an embodiment, the at least one hinge member includes a hinge joint disposed on the first end.

In still another embodiment, the at least one hinge member includes a curved portion between the first and second ends to permit the door to pivot.

In an exemplary embodiment, the linkage is a gooseneck.

In an embodiment, the door roller mechanism including at least one roller rotatably connected to a shaft associated with the door.

In still another embodiment, the door roller mechanism including a support member disposed on a bottom surface of the door, the support member configured to support a load from the shaft and at least one roller.

In yet another embodiment, the support member including an extension member extending downward and beyond a base portion.

In an embodiment, the extension and base portions of the support member are configured to absorb vibrations during operation of the aircraft.

In another embodiment, the support member further includes a brace member configured for transferring vibrations between the door and the support member.

In an illustrative embodiment, the track assembly includes at least one track supported by the movable proprotor housing.

In an embodiment, the movable proprotor housing includes a channel opening, the track assembly being disposed in the channel opening.

In another embodiment, the at least one track including a substantially straight guiding structure.

In an embodiment, the at least one track including a curved portion to complement a curvature of the movable proprotor housing.

In still another embodiment, the track assembly includes a track including a pair of side walls defining a channel for receiving the at least one roller therein.

In an embodiment, the track further includes a lip portion disposed on the pair of side walls for securing the at least one roller therein as the at least one roller traverses the track.

In a second aspect, there is provided an aircraft including a nacelle including a movable proprotor housing rotatable relative to a fixed portion of the nacelle from a forward flight mode to a vertical flight mode and a proprotor gearbox door connected to the movable proprotor housing and pivotably coupled to the fixed portion; and a door system coupled to the nacelle. The door system including a linkage to pivotably couple the door and the fixed portion of the nacelle; a track assembly mounted to the movable proprotor housing; and a door roller mechanism connected to the proprotor gearbox door; wherein the door roller mechanism traverses the track assembly during rotation of the movable proprotor housing.

In another embodiment, the track assembly includes at least one track supported by the movable proprotor housing.

In yet another embodiment, the door roller mechanism including at least one roller rotatably connected to a shaft associated with the door.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 23 is a partial schematic side view of the nacelle according to one example embodiment;

FIG. 24 is a schematic front view of the door roller mechanism in a track assembly according to one example embodiment;

DESCRIPTION OF THE PREFERRED EMBODIMENT

Figure 1:
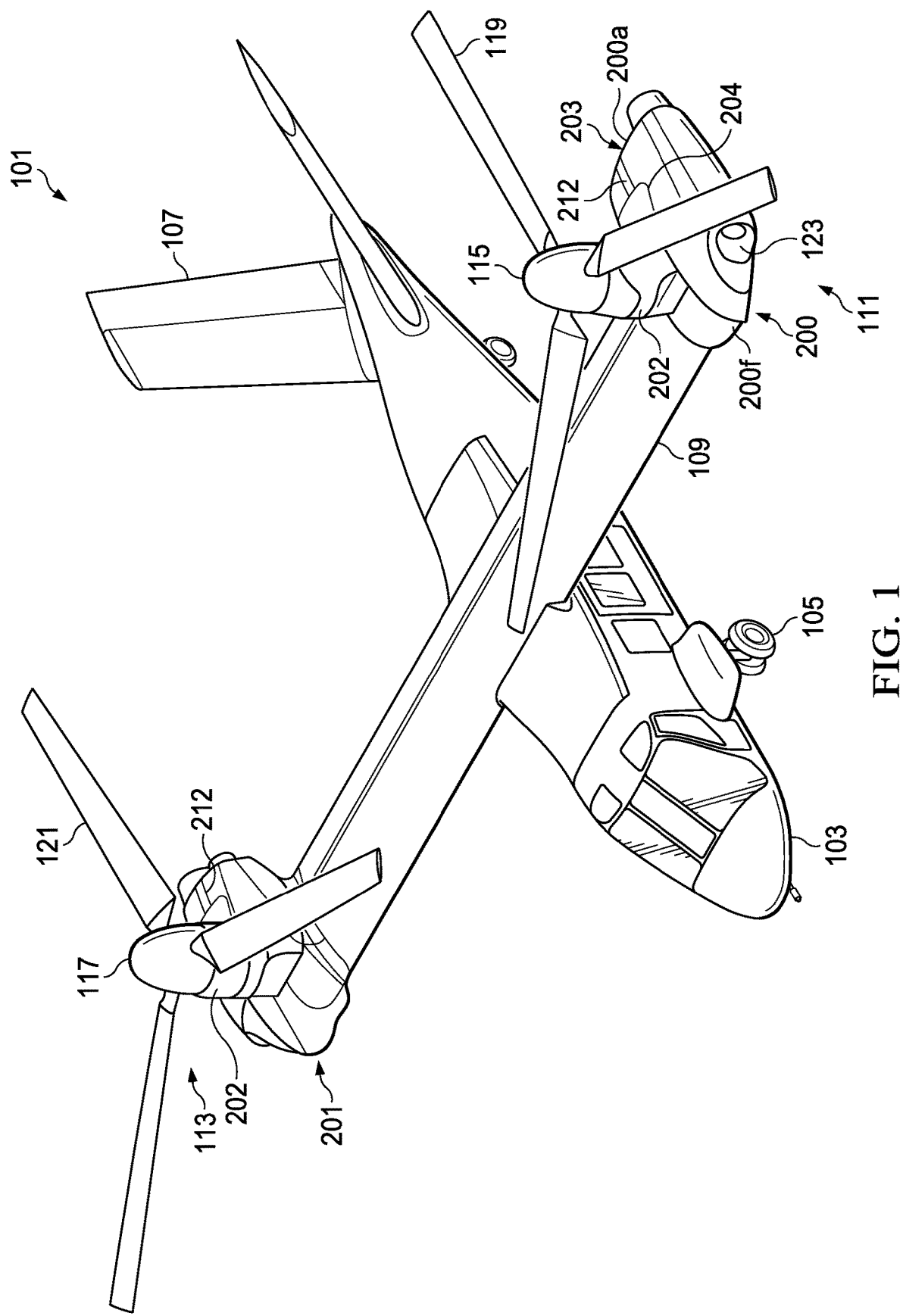
FIG. 1 is a perspective view of a tiltrotor aircraft in the vertical flight mode (helicopter mode), according to one example embodiment.

Illustrative embodiments of aerodynamic fairing mechanisms and assemblies for a rotating proprotor are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

Figure 2:
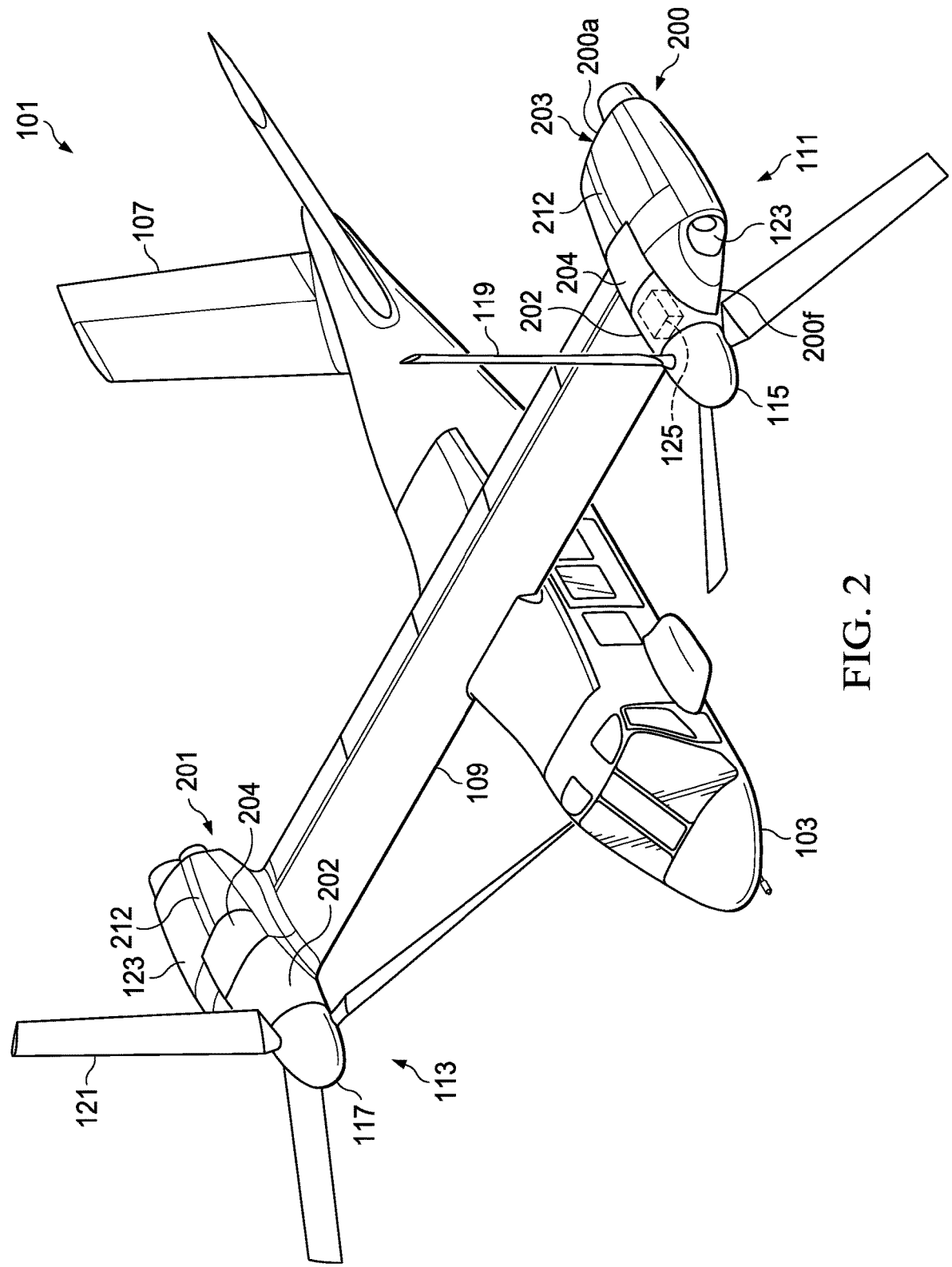
FIG. 2 is a perspective view of a tiltrotor aircraft in the forward flight mode (airplane mode), according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, and a wing member 109, a propulsion system 111, and a propulsion system 113. Each propulsion system 111, 113 includes a nacelle 200, 201 disposed at a fixed location relative to wing member 109 and a rotatable gearbox proprotor system 115, 117 respectively. Each rotatable proprotor gearbox system 115, 117 has a plurality of rotor blades 119, 121, respectively. The position of the rotatable proprotor gearbox systems 115, 117 as well as the pitch of the rotor blades 119, 121, can be selectively controlled in order to selectively control direction, thrust, and lift of the tiltrotor aircraft 101.

FIG. 1 illustrates tiltrotor aircraft 101 in vertical flight mode (helicopter mode), in which the rotatable proprotor gearbox systems 115, 117 are positioned substantially vertical to provide a lifting thrust. FIG. 2 illustrates tiltrotor aircraft 101 in forward flight mode (airplane mode), in which the rotatable proprotor gearbox systems 115, 117 are positioned substantially horizontal to provide a forward thrust in which a lifting force is supplied by the wing member 109. It should be appreciated that tiltrotor aircraft can be operated such that rotatable proprotor gearbox systems 115, 117 are selectively positioned between the airplane mode and the helicopter mode, which can be referred to as a conversion mode.

Further, propulsion systems 111, 113 are illustrated in the context of tiltrotor aircraft 101; however, propulsion systems 111, 113 can be implemented on other tiltrotor aircraft. For example, an alternative embodiment may include a quad tiltrotor that has an additional wing member aft of the wing member 109, the additional wing member can have additional propulsion systems similar to propulsion systems 111, 113. In another embodiment, propulsion systems 111, 113 can be used with an unmanned version of tiltrotor aircraft 101. Further, propulsion system 111, 113 can be integrated into a variety of tiltrotor configurations.

The propulsion system 113 is substantially symmetric to the propulsion system 111; therefor, for the sake of efficiency certain features will be disclosed only with regard to propulsion system 111. However, one of ordinary skill in the art would fully appreciate an understanding of propulsion system 113 based upon the disclosure herein of propulsion system 111.

In the illustrated embodiments, propulsion system 111 is shown including nacelle 200 fixed relative to wing member 109 and disposed at the outboard end of wing member 109. Nacelle 200 encloses and supports an engine 123. Engine 123, such as for example a turbine engine, and parts of a torque transfer mechanism that provide power to a proprotor gearbox (PRGB) 125 to drive rotor blades 119, all as disclosed in U.S. Pat. No. 9,174,731, the entire content of which is hereby incorporated by reference.

Figure 3A:
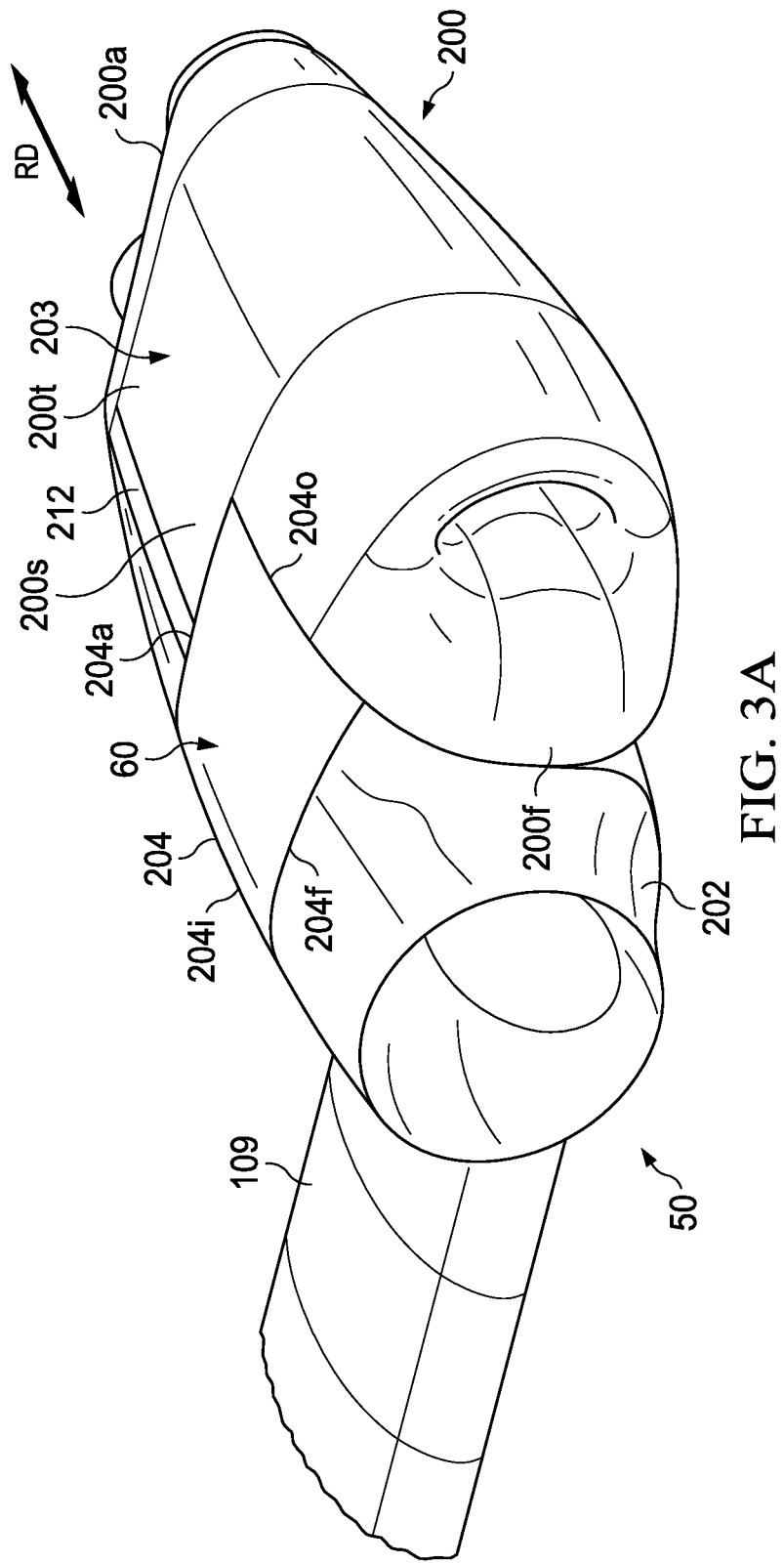
FIG. 3A-3B is a partial perspective view of a nacelle and a PRGB door in forward flight mode, according to one example embodiment.
Figure 3B:
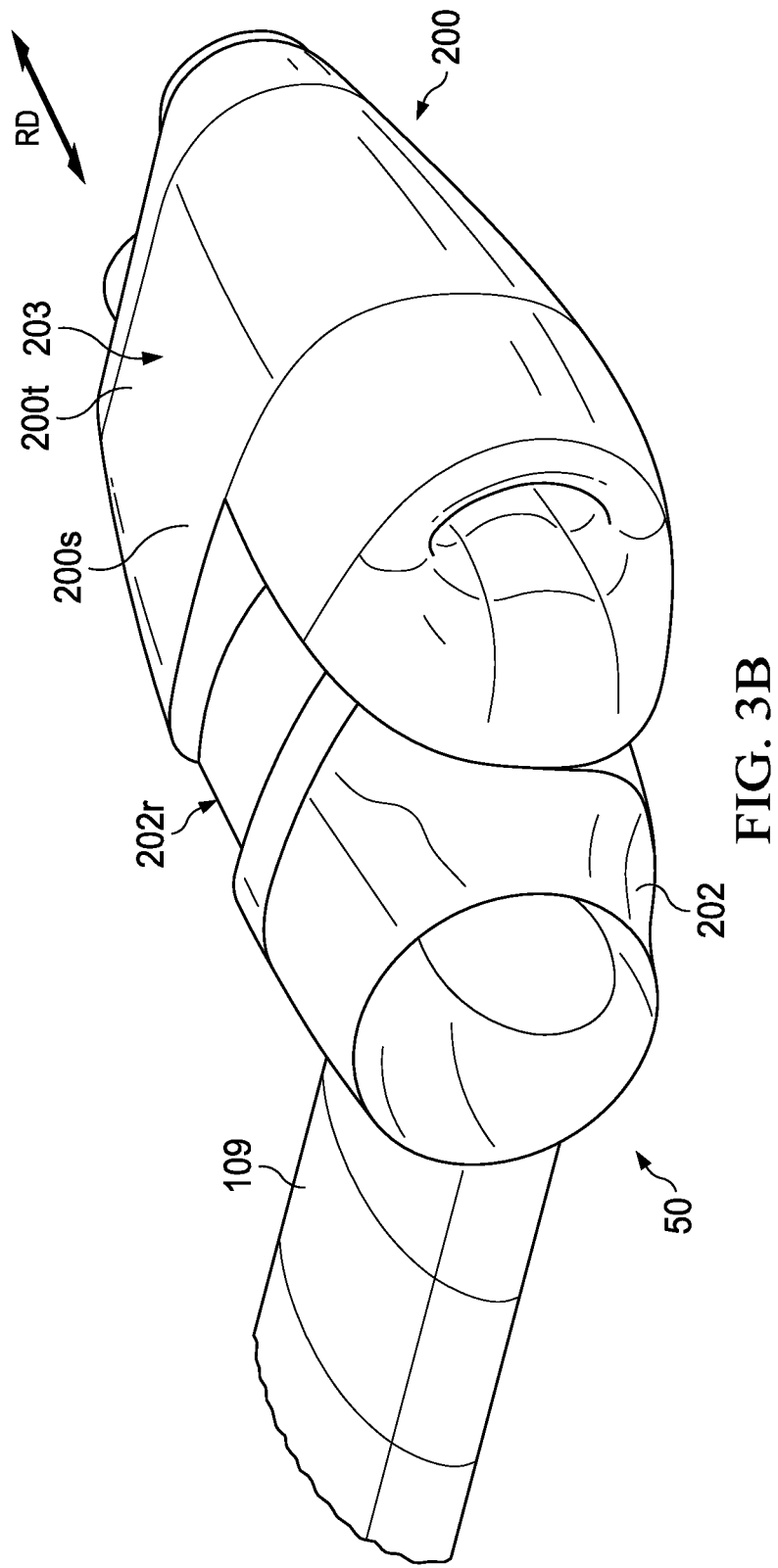
Figure 4:
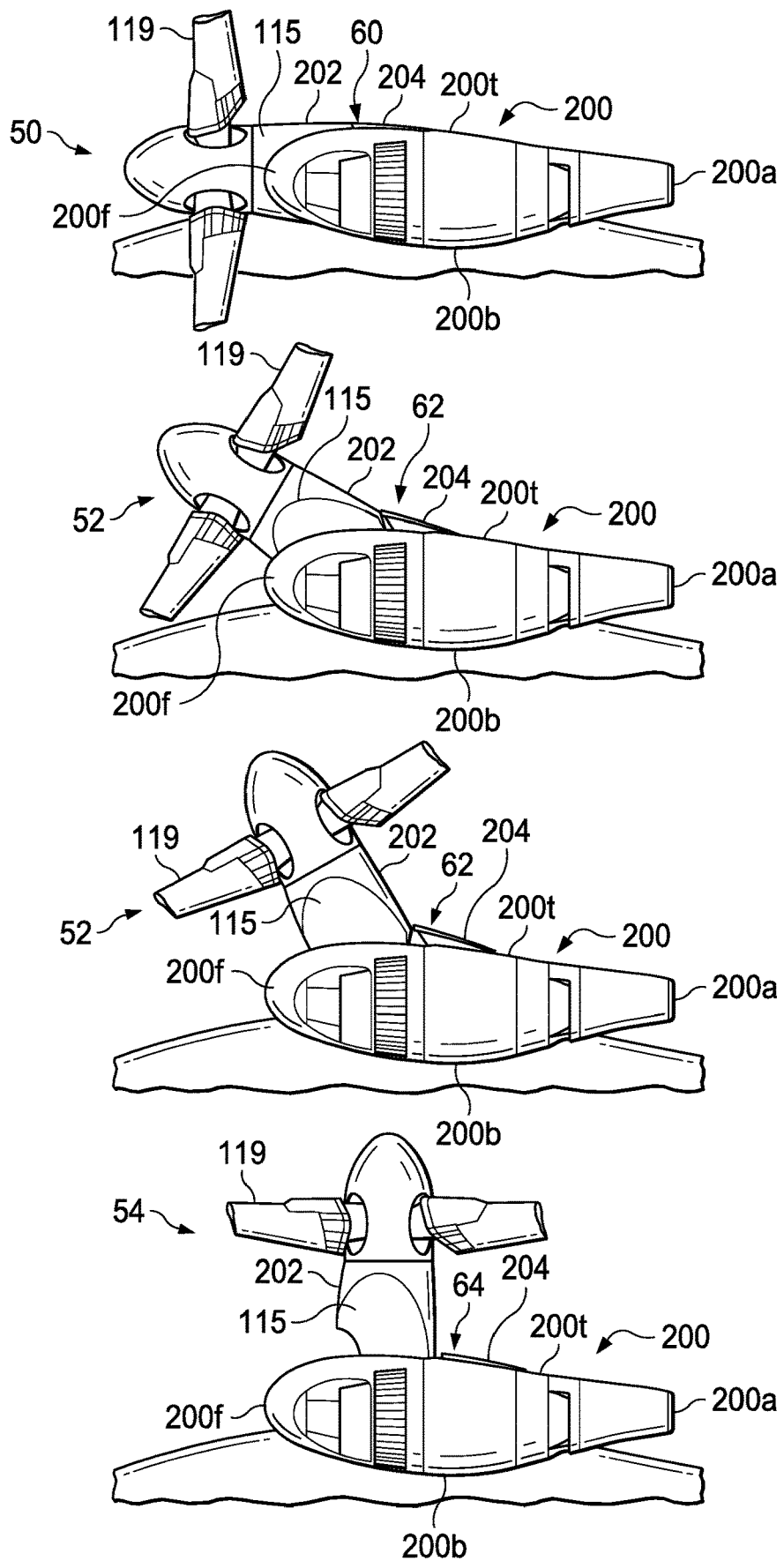
FIG. 4 is a series of side views of the nacelle and a PRGB door in forward flight mode, transition modes, and vertical flight mode, according to one example embodiment.

As shown in FIGS. 3A-3B and 4, proprotor housing 202 rotates relative to the nacelle 200 as the aircraft transitions between the forward flight mode (airplane mode) and the vertical flight mode (helicopter mode). In forward flight mode, as shown in FIG. 3B, proprotor housing 202 is oriented generally horizontally and can form a recess or indentation 202r in an aft portion 202a of the proprotor 202. Recess 202r permits clearance during rotation of the proprotor housing 202; however, recess 202r can provide a significant source of aerodynamic drag to the aircraft 101. Door 204 is connected to an aft portion of proprotor housing 202 and nacelle 200. Door 204 can provide an aerodynamic surface to cover recess 202r. In some embodiments, door 204 can protect adjacent components from environmental or other exterior elements or forces while being sufficiently stiff to avoid vibration or deflection.

In forward flight mode, as shown in FIG. 3A and top of FIG. 4, proprotor housing 200 is in a horizontal orientation 50 and door 204 is in a closed position 60 to provide an aerodynamic profile to propulsion system 111. During conversion (transition) mode 52, as shown in the middle of FIG. 4, proprotor housing 200 is in a non-horizontal orientation 52 and door 24 is in at least a partially opened position 62 to accommodate movement of the movable proprotor housing 202 upward or downward. In vertical flight mode, as shown at the bottom of FIG. 4, proprotor housing 200 is in a non-horizontal orientation, which can be a generally vertical orientation 54, and door 204 is in an open position 64. When door 204 is in closed position 60, door can provide an aerodynamic profile to the propulsion system 111, can cover recess 202r, and/or can cover any gap between proprotor housing 202 and nacelle 200.

Figure 5A:
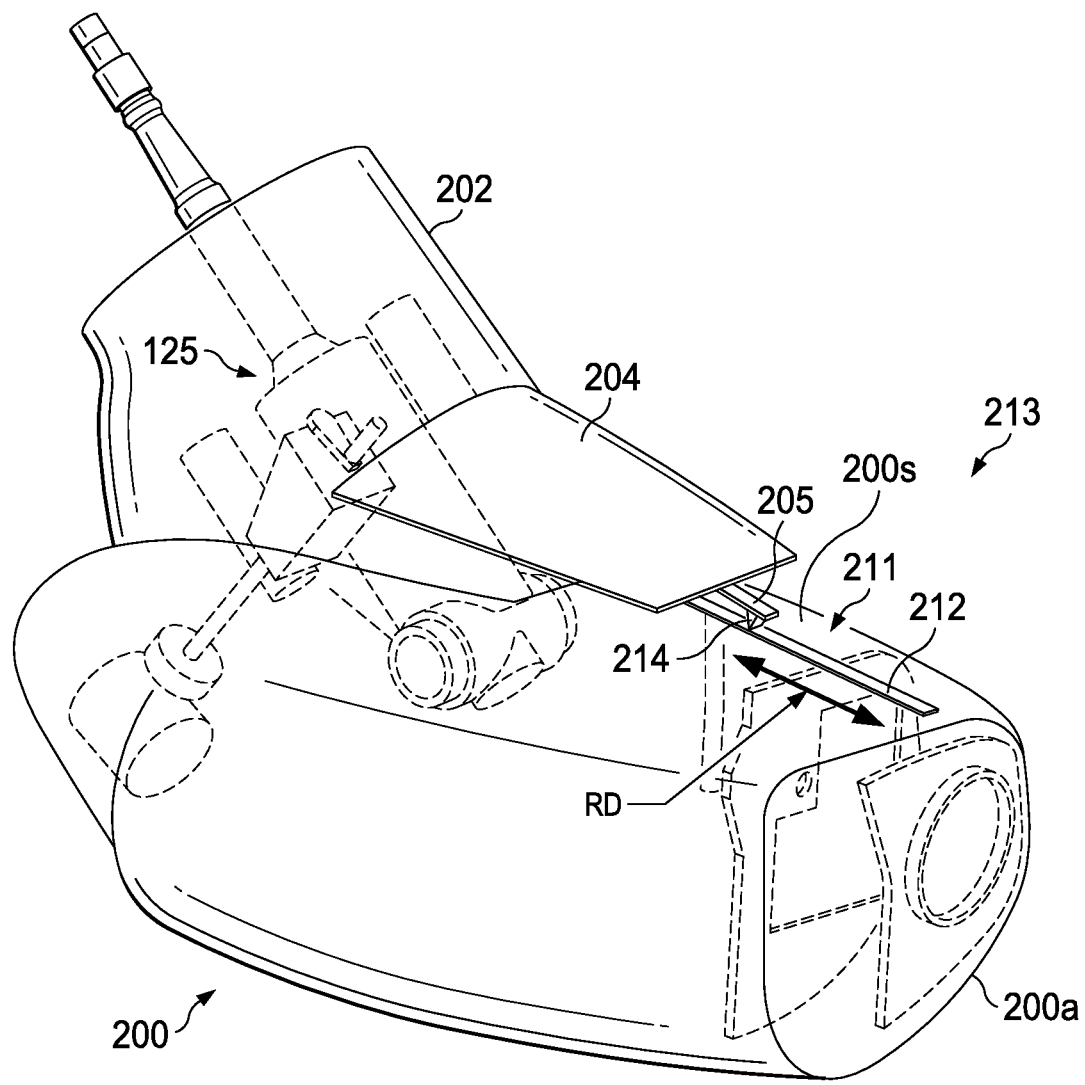
FIGS. 5A-5C are perspective views of a PRGB door and hinge fittings for connecting to the PRGB system and with a bogie mechanism, according to an example embodiment.
Figure 5B:
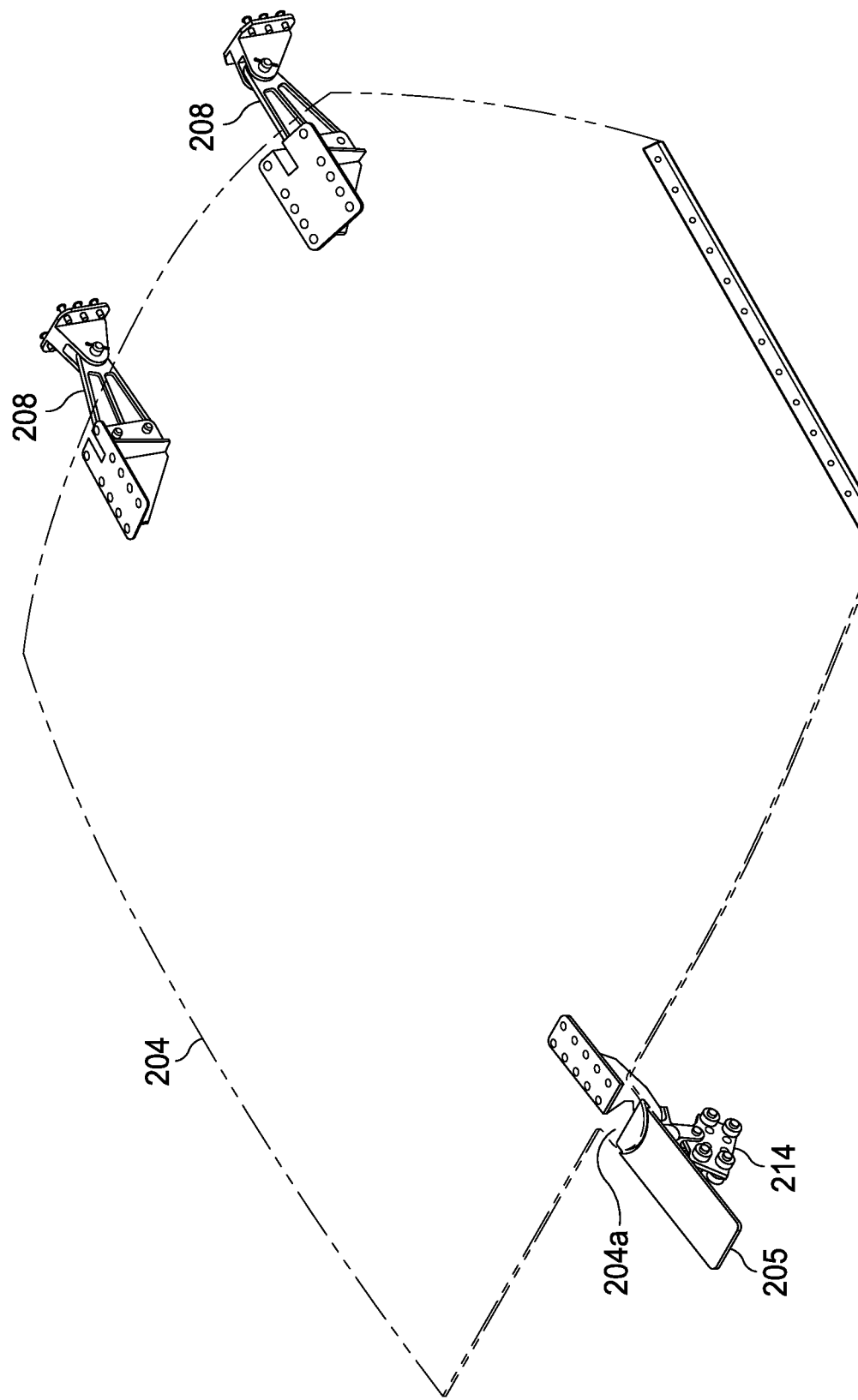
Figure 5C:
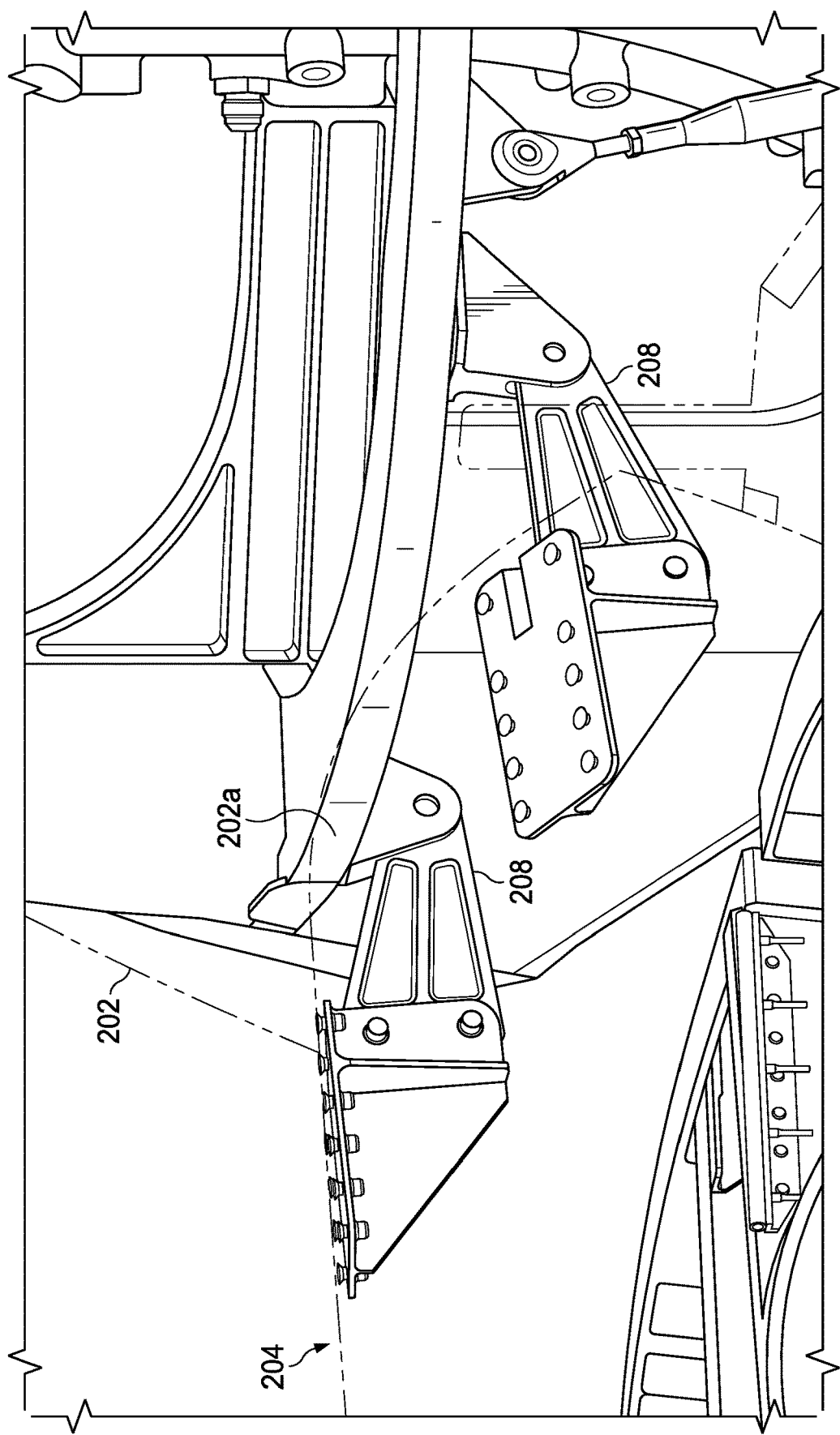
Figure 6:
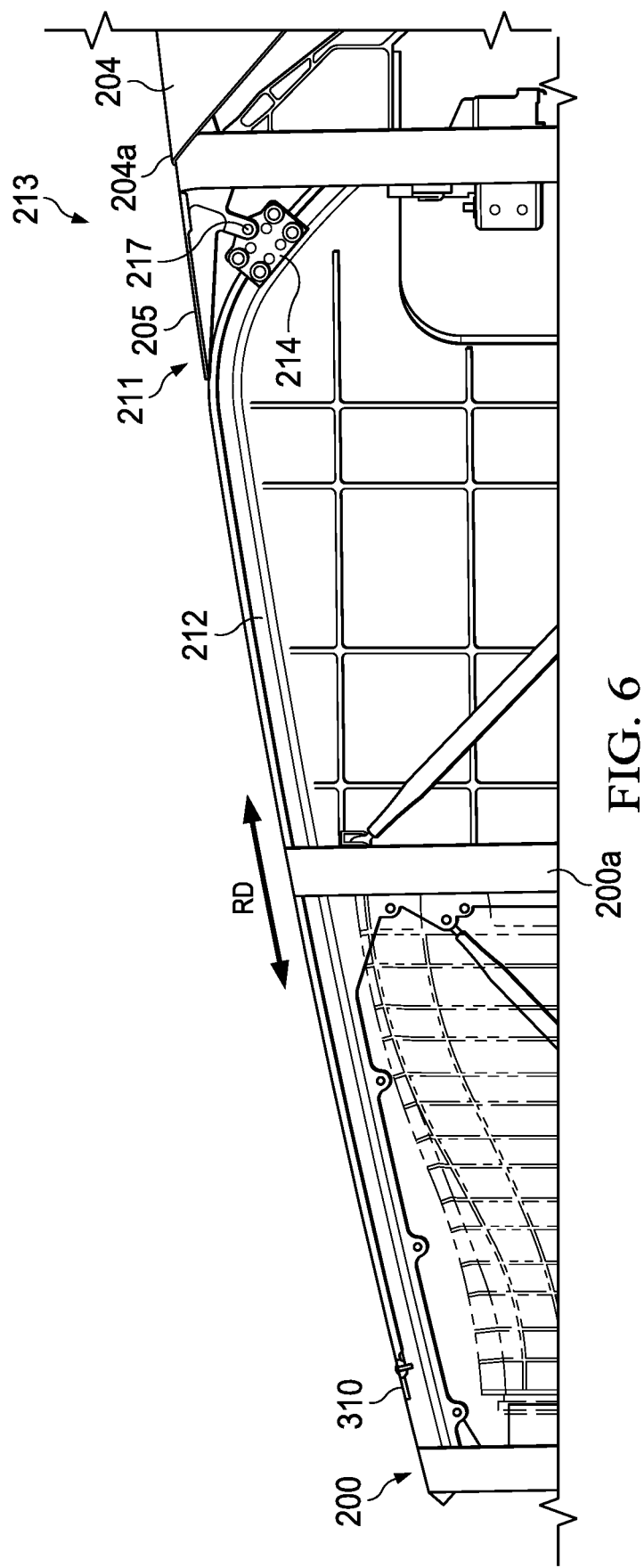
FIG. 6 is a partial elevation view of a PRGB door in the closed position for forward flight mode, according to an exemplary embodiment.
Figure 7:
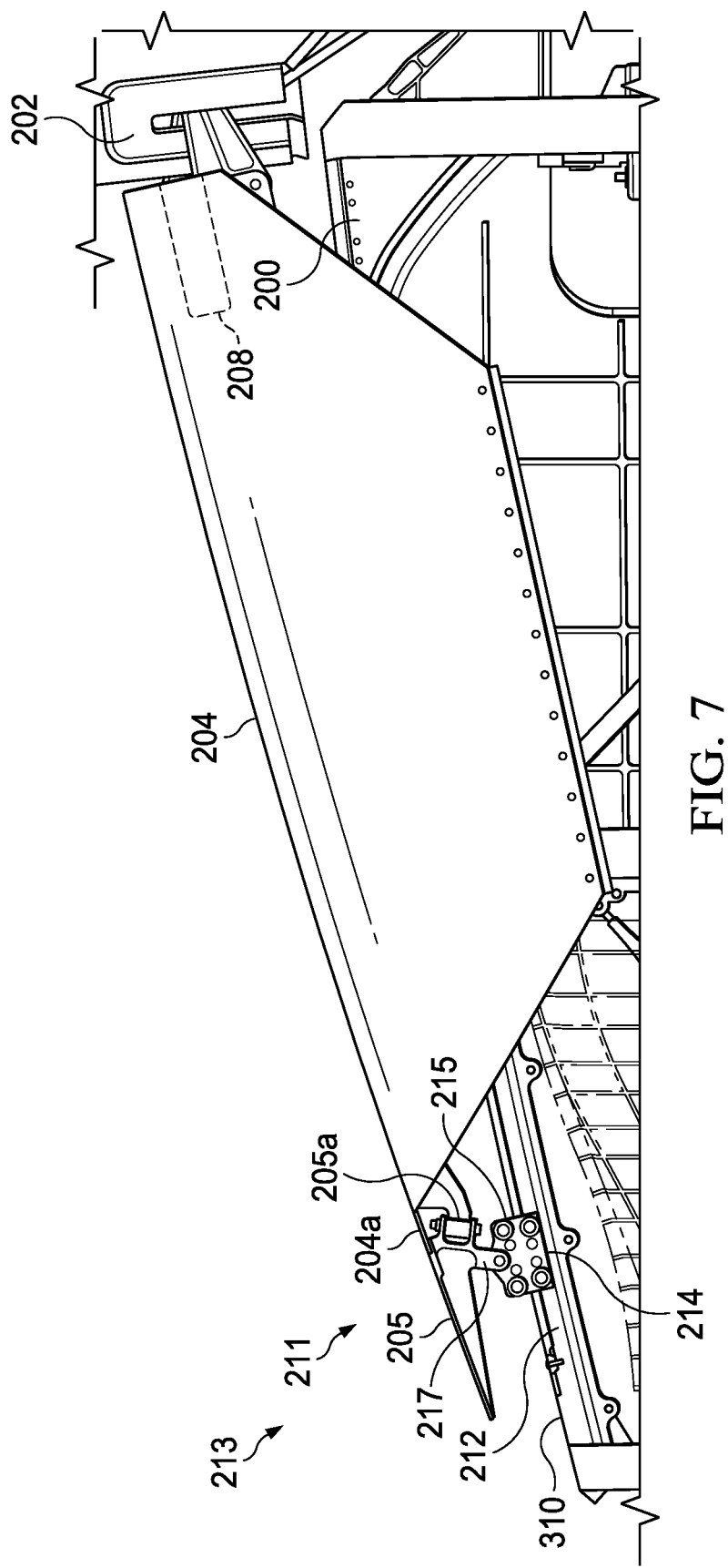
FIG. 7 is a partial elevation view of a PRGB door in the open position for vertical flight mode, according to an exemplary embodiment.

In certain exemplary embodiments shown in FIGS. 5A-12, door 204 can be configured to be connected to the proprotor housing frame 202a by hinge fittings 208 disposed at the forward portion 204f of door 204, as shown in FIGS. 5B, 5C, and 7, or other connector mechanism that allows the proprotor housing 202 to be rotated relative to nacelle 200. In some embodiments, hinge fittings 208 can be disposed on at least one of the outboard side 204o and inboard side 204i of door 204.

Door 204 is connected to nacelle 200 by a linkage 213. In some embodiments, linkage 213 is disposed on an aft portion 204a of door 204. In other embodiments, linkage 213 is disposed on at least one of the outboard side 204o and inboard side 204i of door 204.

In the illustrated embodiment, linkage 213 includes a roller track assembly 211 including a roller track 212 fixedly mounted externally to nacelle 200 and a door roller mechanism 214 that rides on the roller track 212. In an embodiment, roller track 212 is mounted in top surface 200t of the aft portion 200a of the nacelle 200. Roller track 212 can be attached by fasteners to bulkheads and/or frames 200a of nacelle 200 support structure, FIG. 6. Roller track 212 defines a rolling direction RD of the door 204, FIGS. 5A and 6, in response to rotation to the proprotor housing 202 during conversion between the forward flight mode and the vertical flight mode of the aircraft. That is, door 204 can move back and forth in the rolling direction RD in response to rotation of the proprotor housing 202 during flight mode transitions.

Figure 8:
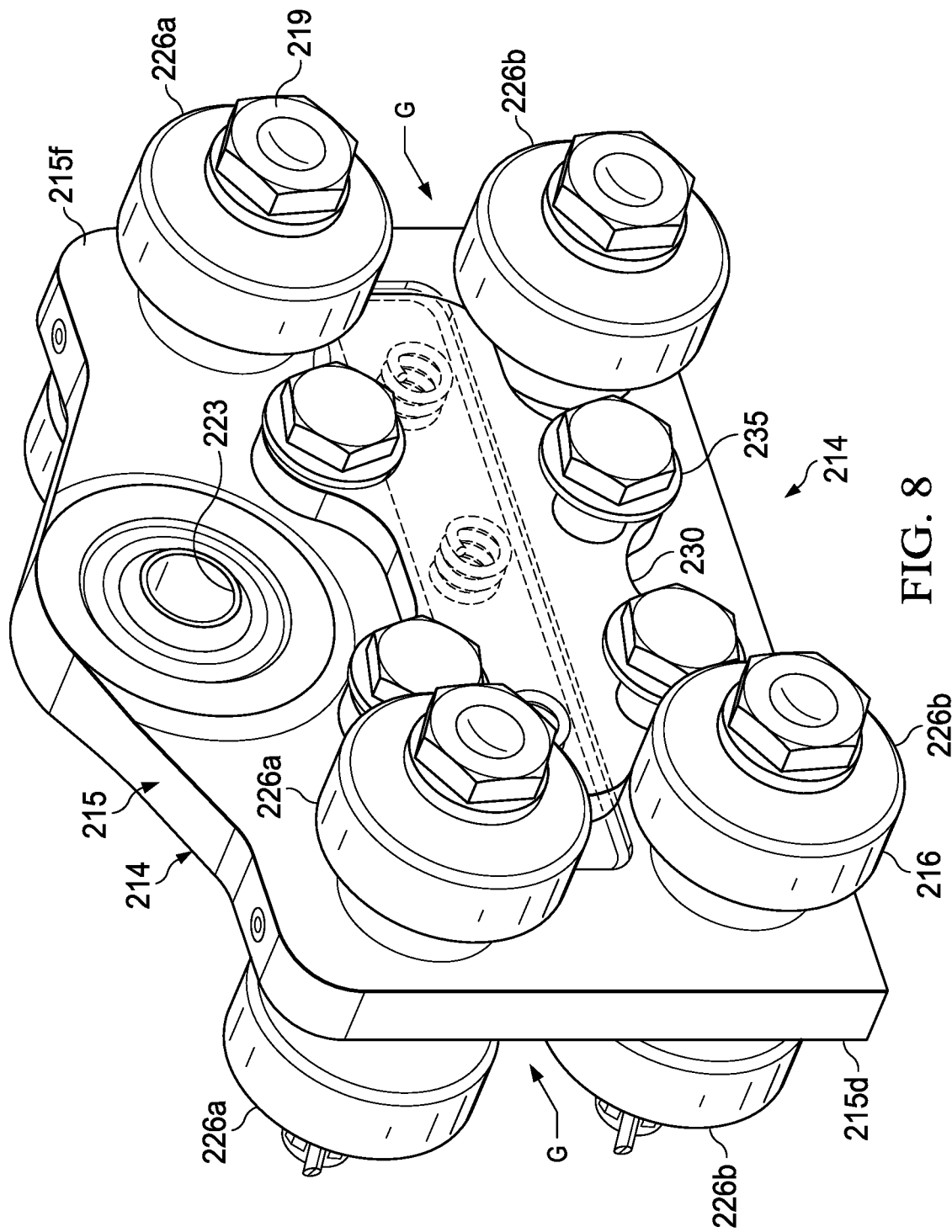
FIG. 8 is a perspective view of an assembled door roller mechanism, according to an exemplary embodiment.

In certain embodiments, the door roller (bogie) mechanism 214 is connected to structural extension 205 of the door 204, as shown in FIGS. 7-8, as described below through a swivel joint 205a. Door roller mechanism 214 is an assembly that can include a carriage member 215 having a door attachment feature 217 that is connected to the structural extension 205 of door 204, FIGS. 7-9. In certain embodiments, carriage member 215 includes an upstanding plate including corrosion resistant stainless (CRES) steel or other suitable material. In certain embodiments, the door attachment feature 217 can comprise a spherical bearing 223 connected to the door structural extension 205.

Figure 9:
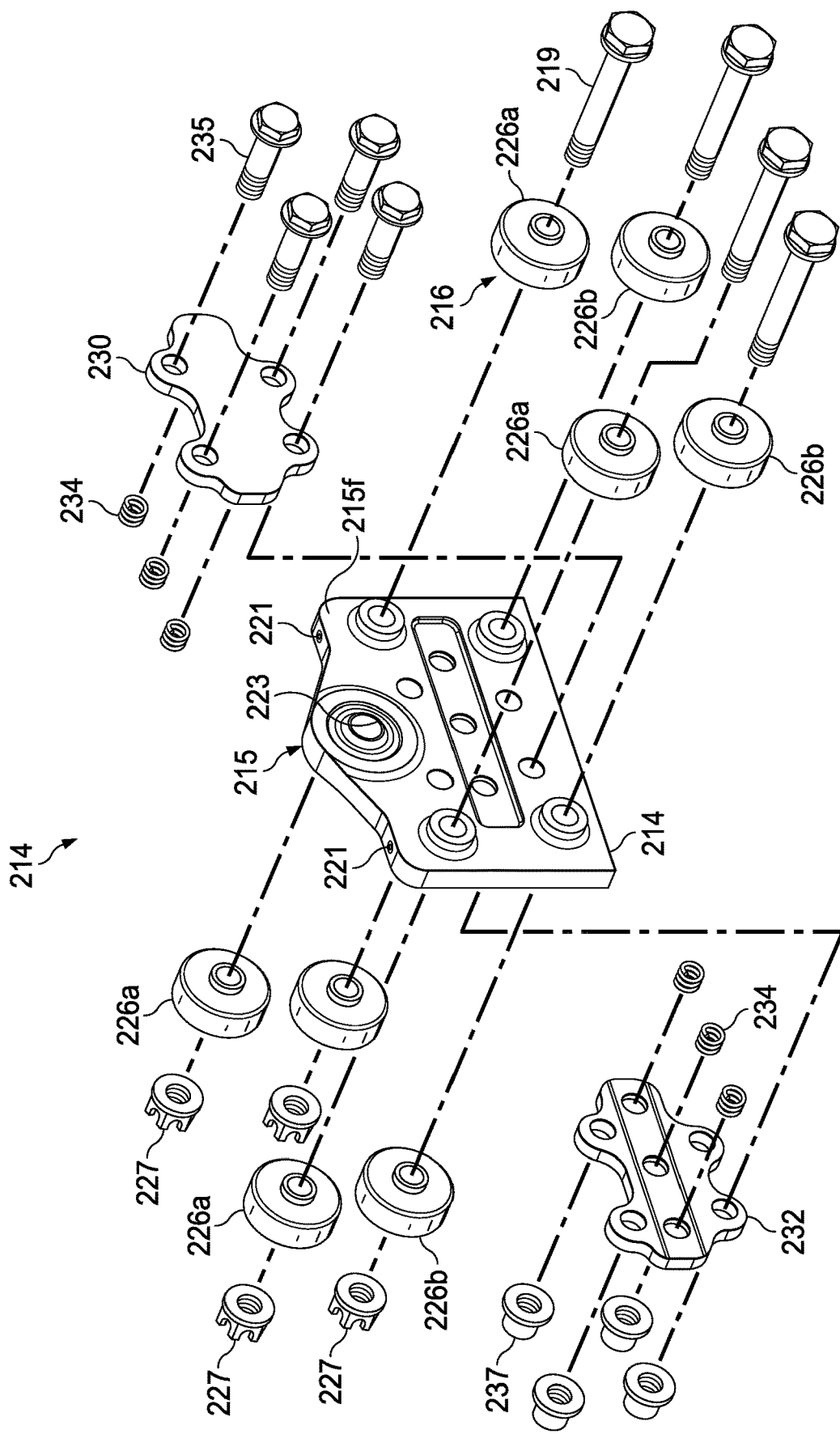
FIG. 9 is an exploded view of a door roller mechanism, according to an exemplary embodiment.

Referring to FIGS. 8-9, at least one roller 216 is disposed for rotation on a first side 215f and on an opposite second side 215d of the carriage member 215 when the carriage member 215 is moved in the rolling direction RD. In certain embodiments, the at least one roller 216 includes multiple upper forward and aft rollers 226a and multiple lower forward and aft rollers 226b disposed on each of the first side 215f and the second side 215d of the carriage member 215. The multiple upper forward and aft rollers 226a and multiple lower forward and aft rollers 226b are separated by a space G adapted to receive a respective first and second track members 320 and 322 described below. In certain embodiments, these rollers 226a, 226b are arranged in a rectangular pattern on each of the first side 215f and the second side 215d of the carriage member 215 as depicted in FIGS. 8-9 in order to withstand non-linear (angular directed) forces exerted on door 204 during aircraft operation. It is contemplated that roller 216 could include a plurality of rollers in various configurations (triangular, square, hexagonal patterns) that can withstand non-linear (angular directed) forces exerted on door 204.

Each roller 216 can be rotatably mounted on a respective fastener shaft 219 that can be a through bolt and clamped up to the carriage member 215. In an embodiment, each fastener shaft 219 extends through a respective passage through the carriage member 215 from one side to the other and includes a threaded end connected to a respective threaded nut 227. Although upper roller 226a on the first side 215f and upper roller 226a on the second side 215d of the carriage member 215 are shown disposed on a common fastener shaft 219 for rotation, each roller can be mounted by a respective individual fastener for rotation on the carriage member 215. In one embodiment, each roller 216 can be a self-contained ball bearing with a non-rotating inner portion and a rotating outer portion positioned tight against the carriage member 215. In certain exemplary embodiments, rollers 226a, 226b are made of corrosion resistant steel or other suitable material.

The initial positions of the upper rollers 226a are adjusted by set screws 221 that are slotted vertically in the carriage member 215. The set screws 221 limit the range of travel of the bolts 219 for the upper rollers 226a, which sets the distance between the upper rollers 226a and lower rollers 226b.

Referring again to FIGS. 8-9, first and second rub members 230, 232 are disposed on the respective first and second sides 215f, 215d of the carriage member 215 and are resiliently biased laterally outward away from the carriage member 215 by one or more biasing elements 234 disposed between first and second rub members 230, 232 and corresponding first or second side 215f, 215d of the carriage member 215. In certain embodiments, rub members 230, 232 are each slidably mounted on multiple fastener shafts 235 (four shown). In certain embodiments, rub members 230, 232 each can be slidably mounted on the respective fastener shaft by a bushing. First and second rub members 230, 232 can be resiliently biased to contact respective first and second sidewalls 320s, 322s of the respective track members 320, 322 in a manner to be described below. Each fastener shaft 235 extends through a respective passage in the corresponding rub member 230, 232 and through the carriage member 215 from one side to the other and includes a threaded end connected to a respective threaded nut 237.

In certain embodiments, rub members 230, 232 are each spring biased by multiple coil bias springs (three shown in FIG. 9). The rub members 230, 232 are spring biased in opposite lateral directions generally perpendicular relative to the door rolling direction RD so as to contact the respective first and a second sidewalls 320s, 322s, of the track members, FIGS. 10 and 12, in a manner to dampen lateral vibrations of door 204 attached to the door roller mechanism 214. Although multiple individual biasing springs are shown between each rub member 230 and 232 and the carriage member 215, alternative embodiments envisions use of a single spring configuration that is disposed in a carriage member through-hole (not shown) between the rub members 230, 232 to bias both of the rub members. Moreover, other types of springs, such as leaf, cantilever, and other springs, can be used in certain embodiments. Further, resilient biasing elements other than springs, such as one or more resilient bodies located as described above, can be used in practice of certain embodiments.

Rub members 230, 232 can have a plate shape as depicted or any other suitable shape. In certain embodiments, the rub members 230 and 232 are made of aluminum-bronze alloy material, although any suitable material can be employed. An anti-friction coating optionally can be applied on the outer surfaces of the rub members 230, 232. The anti-friction coating can be an anti-friction self-lubricating polymeric composite liner in certain embodiments. In an embodiment, the anti-friction coating is Rexlon 2000, which is a self-lubrication liner made by Rexnord Corporation.

In certain embodiments, roller track assembly 211 includes a housing 300 having flanges 302 and 303 with fastener holes. Housing flanges 302, 303 are fastened to bulkheads and/or frames 200a of the fixed portion 203 of the respective nacelle 200 and 201 structure using fasteners through the fastener holes. In certain embodiments, housing 300 is made in two halves which are assembled using fasteners received in holes in housing alignment flanges 305 shown in FIG. 10, although the housing 300 can be made in one piece or any number of multiple other pieces. The assembled housing 300 is precision located on the fixed portion 203 by laser tracking although conventional assembly methods using determinate assembly holes or tooling can be used. The assembled housing 300 defines the door rolling direction RD for door 204 opening and closing.

Housing 300 includes a longitudinal channel 304 extending along its length. Channel 304 includes a first entry end 304a and a second end forming a deep stowage recess 304b, FIGS. 10-11. Entry end 304a is adapted to receive the door roller mechanism 214 during assembly of the door connection mechanism. To this end, entry end 304a includes an initial converging lead-in entrance 306 that communicates to a descending ramp insert 308, as shown in FIG. 12, to facilitate sliding of the rub members 230, 232 of the door roller mechanism 214 into the channel 304. After assembly, the top of entry end 304a is closed off by a cover plate 310 that prevents door roller mechanism 214 from disengaging from the door track assembly as the proprotor housing 202 is fully converted to the vertical flight mode during operation of the aircraft. Fasteners shown in FIG. 12 are used to attach lead-in ramp insert 308 and cover plate 310 to the housing 300.

Figure 10:
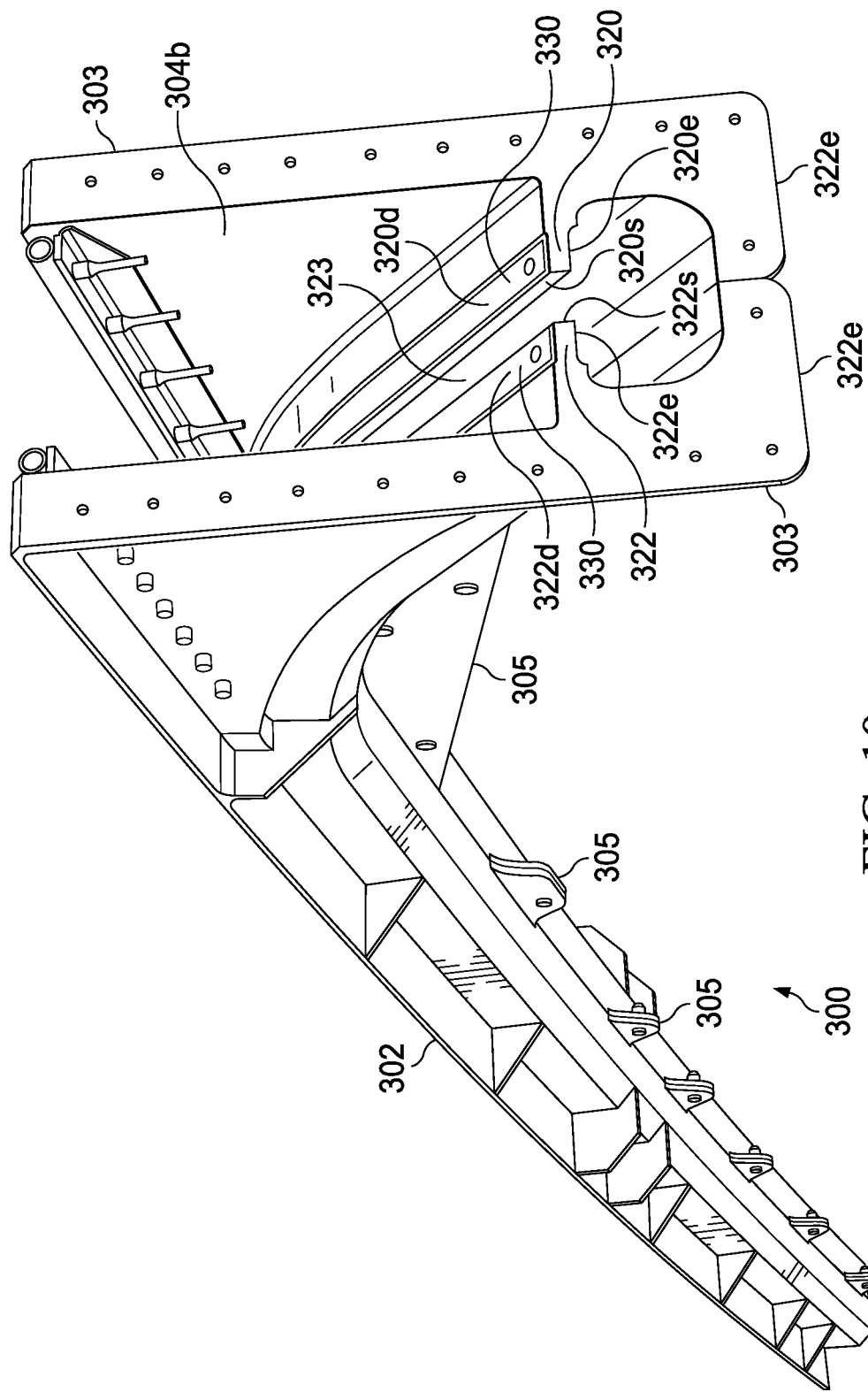
FIG. 10 is a perspective view of a track housing, according to an exemplary embodiment.
Figure 11:
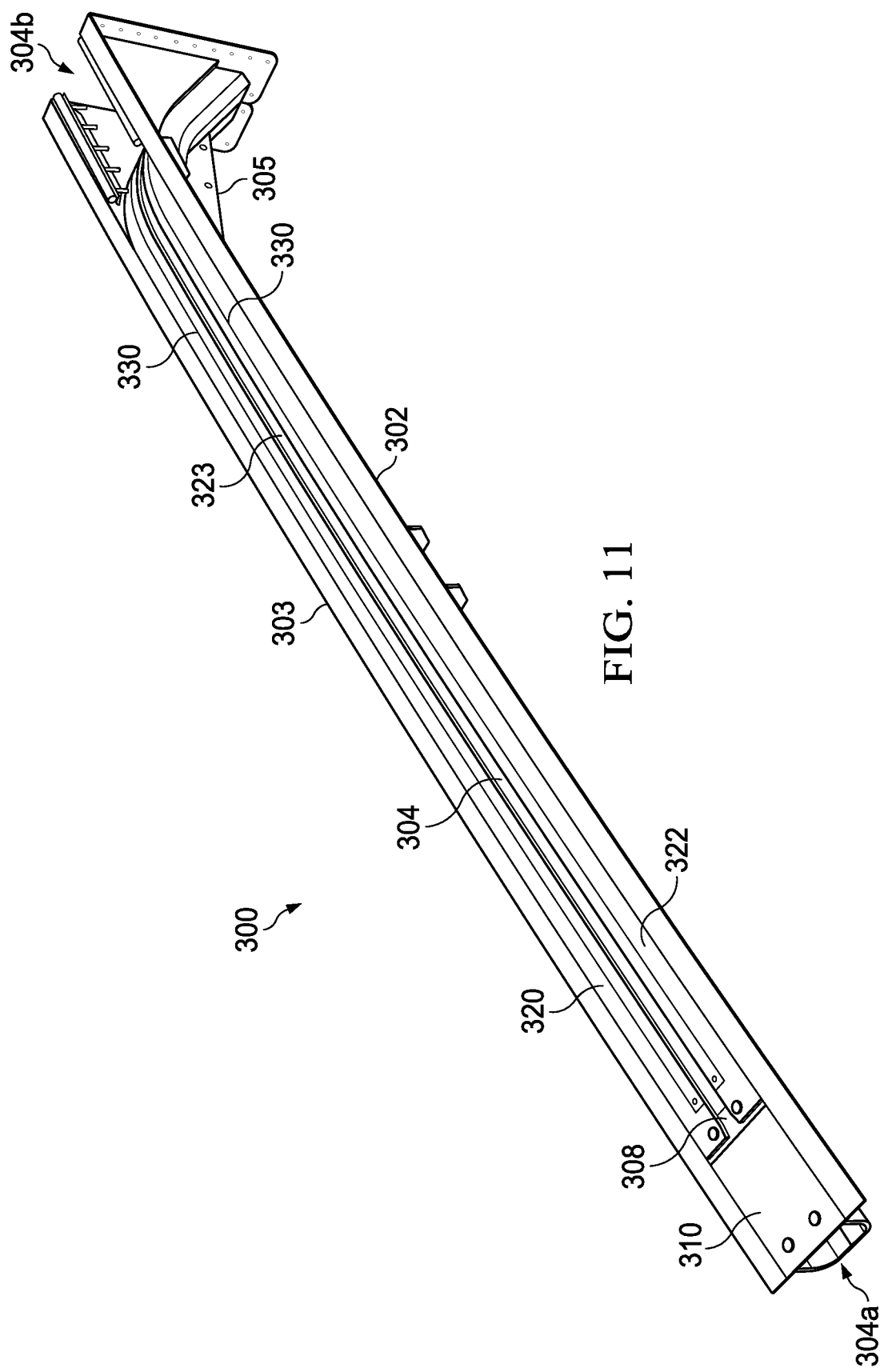
FIG. 11 is a perspective view of a roller track in a track housing, according to an exemplary embodiment.
Figure 12:
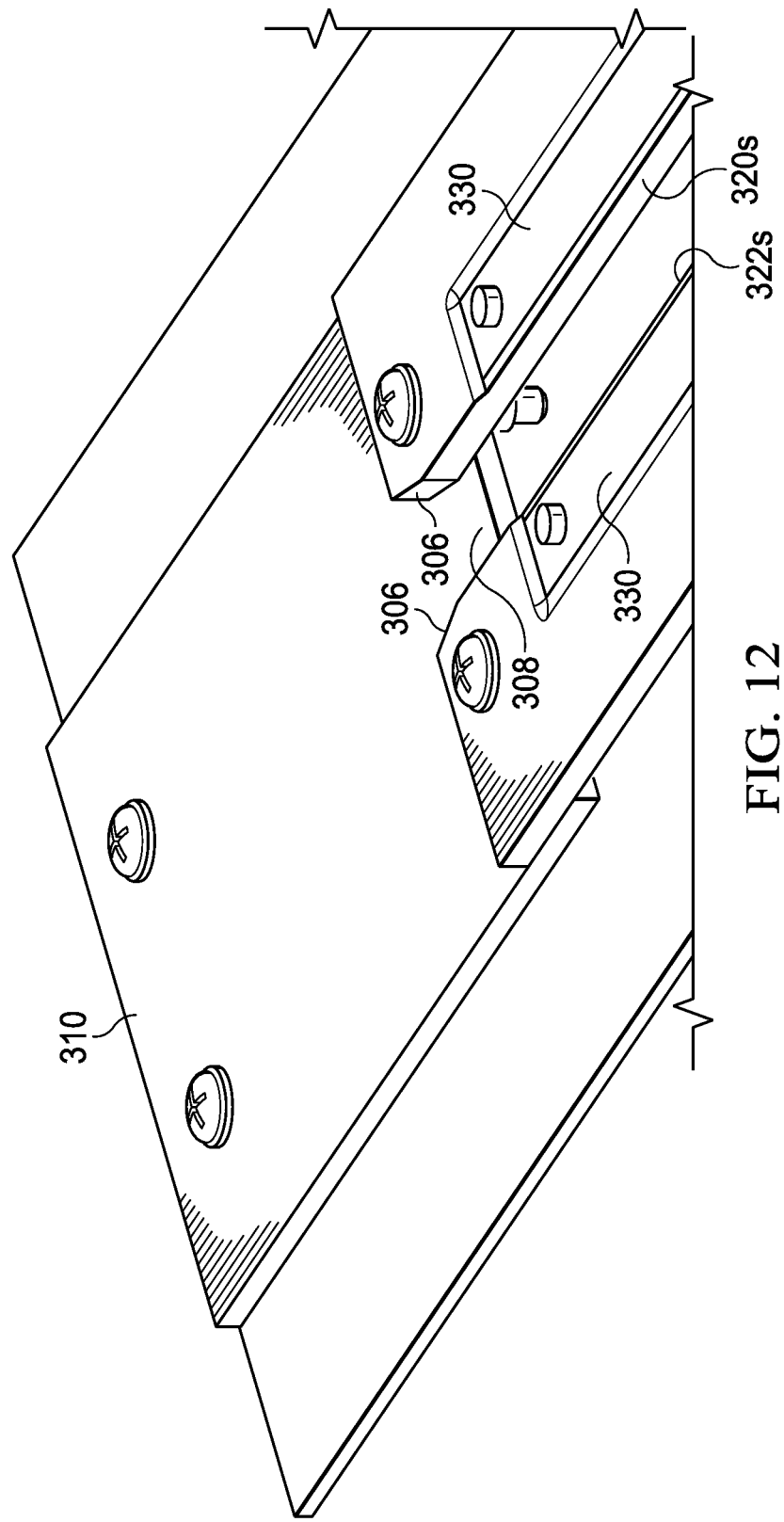
FIG. 12 is an enlarged perspective view of an entry end of the roller track assembly where the roller mechanism is inserted for riding on roller track surfaces, according to an exemplary embodiment.

Referring to FIGS. 10-12, housing 300 includes first and second tracks 320, 322, which may be integral with or separate and connected to the respective housing flange 303, 302. Tracks 320, 322 receive rollers 226a, 226b of the door roller mechanism 214 and extend generally parallel to one another along the length of the channel 304 until they curve and descend at the remote end of the housing into the deep stowage recess 304b, whose shape and depth is selected to completely stow the door roller mechanism 214 out of the way when door 204 is moved to the closed position during the forward flight mode, as shown in FIG. 6.

First and second tracks 320, 322 extend inwardly from facing inner walls of the housing 300 toward one another in a common substantially horizontal plane and terminate short of one another to form a secondary channel 323 therebetween, FIGS. 10-12, through which the rub members 230, 232 of the carriage member 215 of the door roller mechanism 214 traverse.

First and second tracks each includes a respective upwardly facing surface 320d, 322d and downwardly facing surface 320e, 322e. These surfaces extend along the length of the tracks into the stowage recess 304b. Referring again to FIGS. 10-12, in certain embodiments, a wear resistant strip insert 330 is fastened to each of upwardly facing surfaces and downwardly facing surfaces 320d, 322d; 320e, 322e to form wear resistant roller track surfaces. Wear resistant strip inserts 330 are employed when housing 300 is made of material, such as an aluminum alloy, that may suffer excessive wear from the carriage member rollers 216 riding thereon during operation of the door roller mechanism 214. Wear resistant strip inserts are attached by fasteners shown best in FIG. 12 that are spaced apart along the length of the tracks 320, 322. In certain embodiments, wear resistant strip inserts 330 are made of CRES steel (the same material as the roller material), although other suitable wear resistant materials can be used to this same end.

In certain other embodiments, the wear resistant strip inserts 330 may be omitted if the housing 300 is made of a more wear resistant material, or if the housing is provided with more wear resistant roller track surfaces on the tracks 320, 322 by, for example, localized deposition of a wear resistant track material on the tracks, localized heat treatment (e.g. localized laser hardening) of the tracks, or other localized surface hardening treatments to this end.

First and second tracks 320, 322 also include substantially vertical and parallel sidewalls 320s, 322s that face one another and are spaced apart to define the secondary channel 323 that receives the rub members 230, 232 of the carriage member plate 215. Sidewalls 320s, 322s are termed rubbed sidewalls in that the rub members 230, 232 are resiliently biased by the springs or other biasing elements 234 to contact these sidewalls as the door roller mechanism 214 traverses back and forth along the roller tracks 320, 322 in the rolling direction RD.

Each of the sidewalls 320s, 322s includes an anti-friction coating thereon to reduce fretting damage and/or wear resulting from contact with the rub members 230, 232. An illustrative anti-friction coating to this end comprises a composite coating including a matrix material having anti-friction polymer particles dispersed in the matrix material, although other suitable composite or non-composite anti-friction coatings can be used. In certain embodiments, when the tracks 320, 322 of the housing 300 comprises an aluminum alloy, a suitable composite coating comprises an anodized aluminum (aluminum oxide) layer as the matrix material and polytetrafluoroethylene particles dispersed in the anodized layer. Such a coating can be formed on the surfaces of sidewalls 320s, 322s by spraying or other suitable process.

Moreover, pursuant to certain embodiments, cover plate 310 prevents disengagement of the door roller mechanism 214 from the roller track assembly 211 as the proprotor housing 202 is fully converted to the vertical flight mode during operation of the aircraft, FIG. 7. Further, when the proprotor housing 202 is fully converted to the forward flight mode, the door structural extension 205 covers the recess 202b and door roller mechanism 214, FIG. 6. Door 204 can include an integral tail section that is fastened on the structural extension 205 to this same end.

Figure 13A:
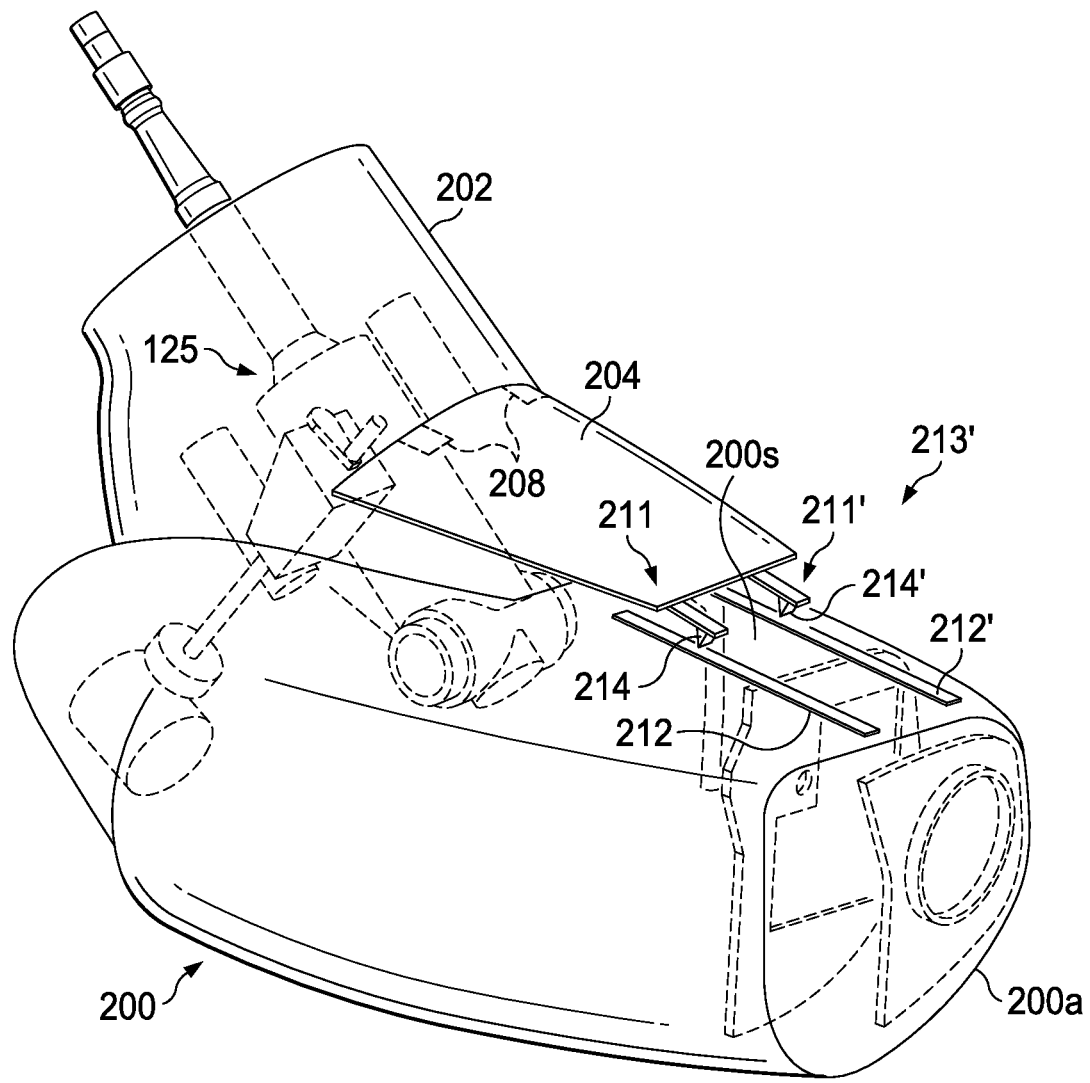
FIG. 13A is perspective view of a PRGB door including a pair of door roller mechanisms and tracks, according to an exemplary embodiment.

Referring now to FIG. 13A, an alternative embodiment of a linkage 213' is illustrated. Linkage 213' includes a pair of roller track assemblies (e.g., first roller track assembly 211 and second roller track assembly 211'). Roller track assembly 211' is substantially similar in form and function to roller track assembly 211. Thus, disclosure herein regarding assembly 211 is also applicable to assembly 211'. In the illustrated embodiment, as proprotor housing 202 rotates it causes door 204 and door roller mechanisms 214, 214' to translate aft respectively along track 212, 212' towards the aft portion 200a of nacelle 200 in an open position. The linkages 213, 213' are shown and described with reference to the proprotor housing 202 rotating relative to the nacelle 200, it will be appreciated that at least one of the proprotor housing 202 and the nacelle 200 can have various aerodynamic profiles and varying internal components. Accordingly, the shape and arrangement of the linkages described herein can be also configured for the particular aerodynamic profile and/or internal components (e.g., the track could include a localized contour change to permit clearance from an internal component).

Figure 13B:
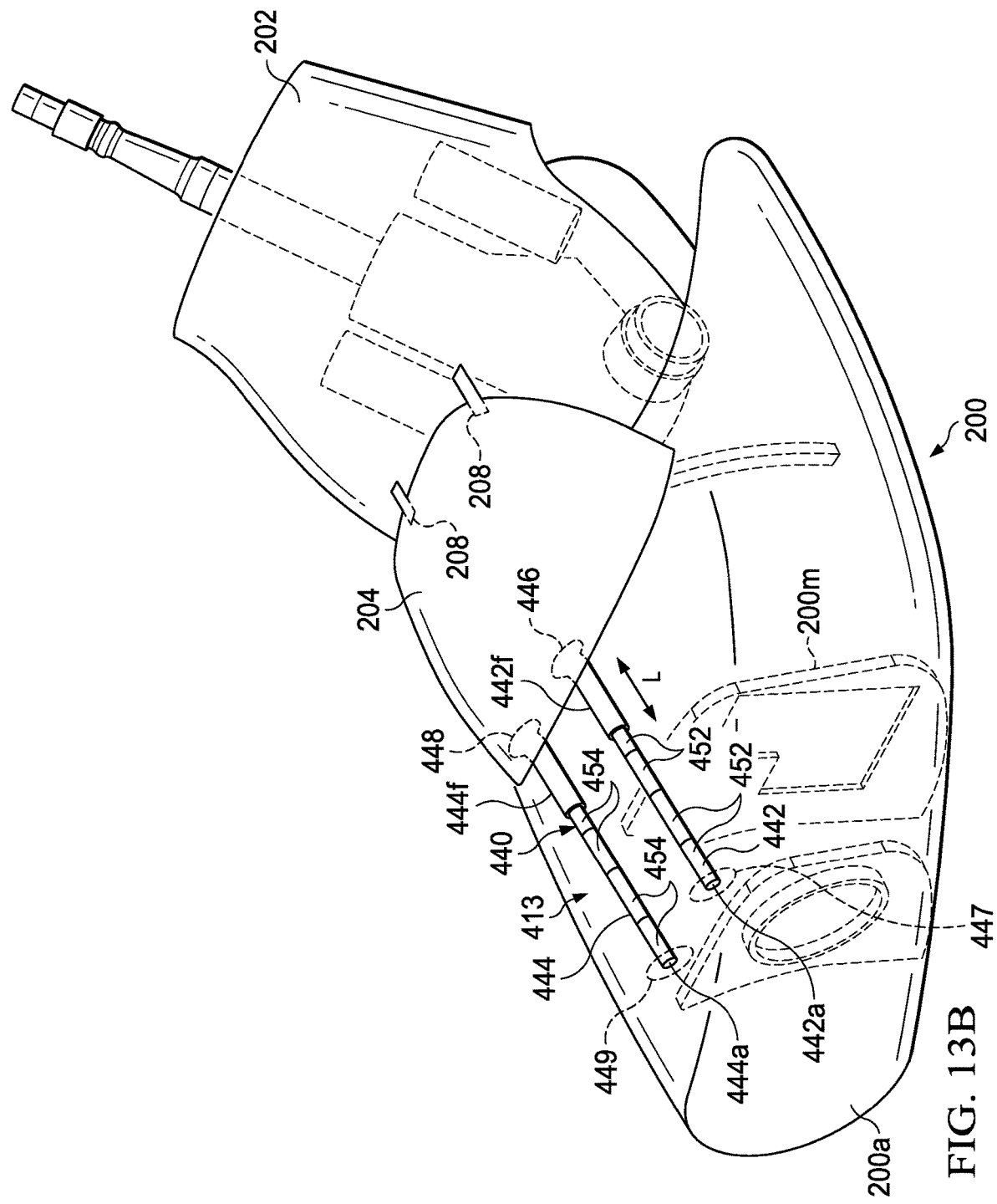
FIG. 13B is a perspective view of a PRGB door including a pair of telescoping struts, according to one embodiment.

Referring now to FIG. 13B, another embodiment of linkage 413 is illustrated. Linkage 413 includes at least one strut 442 coupled to door 204 and nacelle 200. In an exemplary embodiment, linkage 413 comprises a pair of struts 440. The pair of struts 440 is substantially similar in form and function to the roller track assembly 213, except as noted herein. Thus, disclosure herein regarding roller track assembly 213 is also applicable to the pair of struts 413, except as noted herein. In the illustrated embodiment, the pair of struts 440 includes a first strut 442 and a second strut 444. Struts 442, 444 can represent any component that is capable to extend and retract longitudinally along the direction L. In some embodiments, when door 204 is in the open positions 62, 64, struts 442, 444 can resist longitudinal compression to secure door 204 in a particular location above the nacelle 200. In an embodiment, struts 442, 444 can dampen the oscillations from the proprotor housing 202.

The forward portion 442f, 444f of each strut 442, 444 can include fastening ends 446, 448, respectively, each having a plurality of fastener holes extending therethrough for securing to the interior surface of door 204. The aft portion 442a, 444a of each strut 442, 444 can include fastening ends 447, 449, respectively, each having a plurality of fastener holes extending through for securing to the exterior surface of nacelle 200 and/or on a frame member 200m of nacelle 200. In some embodiments, the attachment locations for the struts 442, 444 can be recessed locally in the nacelle 200 or covered by a contoured fairing. In an embodiment, flat fastening ends 446, 448 can respectively be disposed at forward ends 442f, 444f of struts 442, 444; however, it will be appreciated that aft ends 442a, 444f of struts 442, 444 can also be configured to include flat fastening ends for securing to nacelle 200. In an embodiment, the aft ends 442a, 444a of the struts 442, 444 can be connected to or positioned on a frame member 200m and/or on an interior or exterior surface of nacelle 200. Fastening ends 446, 448, 447, 449 can include a bearing housing to permit a pivoting motion for strut 442, 444 when the proprotor housing 202 is in a non-horizontal position. In some embodiments, at least one of the fastening ends 446, 448, 447, 449 can be a monoball style joint to avoid side loads.

In an exemplary embodiment, as shown in FIG. 13B, each strut 442, 444 may be a telescoping strut. Each strut 442, 444 can include a plurality of strut segments 452, 454, respectively, having various outer diameters to permit telescoping expansion and retraction. It is contemplated that each strut 442, 444 could include a variety of configurations that can include two, three, four, five, six, seven, eight, nine, ten, or more strut segments, 452, 454.

It is further contemplated that the struts 442, 444 could come in a variety of shapes and sizes. Struts 442, 444 are shown as generally cylindrical in shape. In other embodiments, struts are generally square, u-shaped, or other suitable shape to achieve a telescoping function.

Figure 14A:
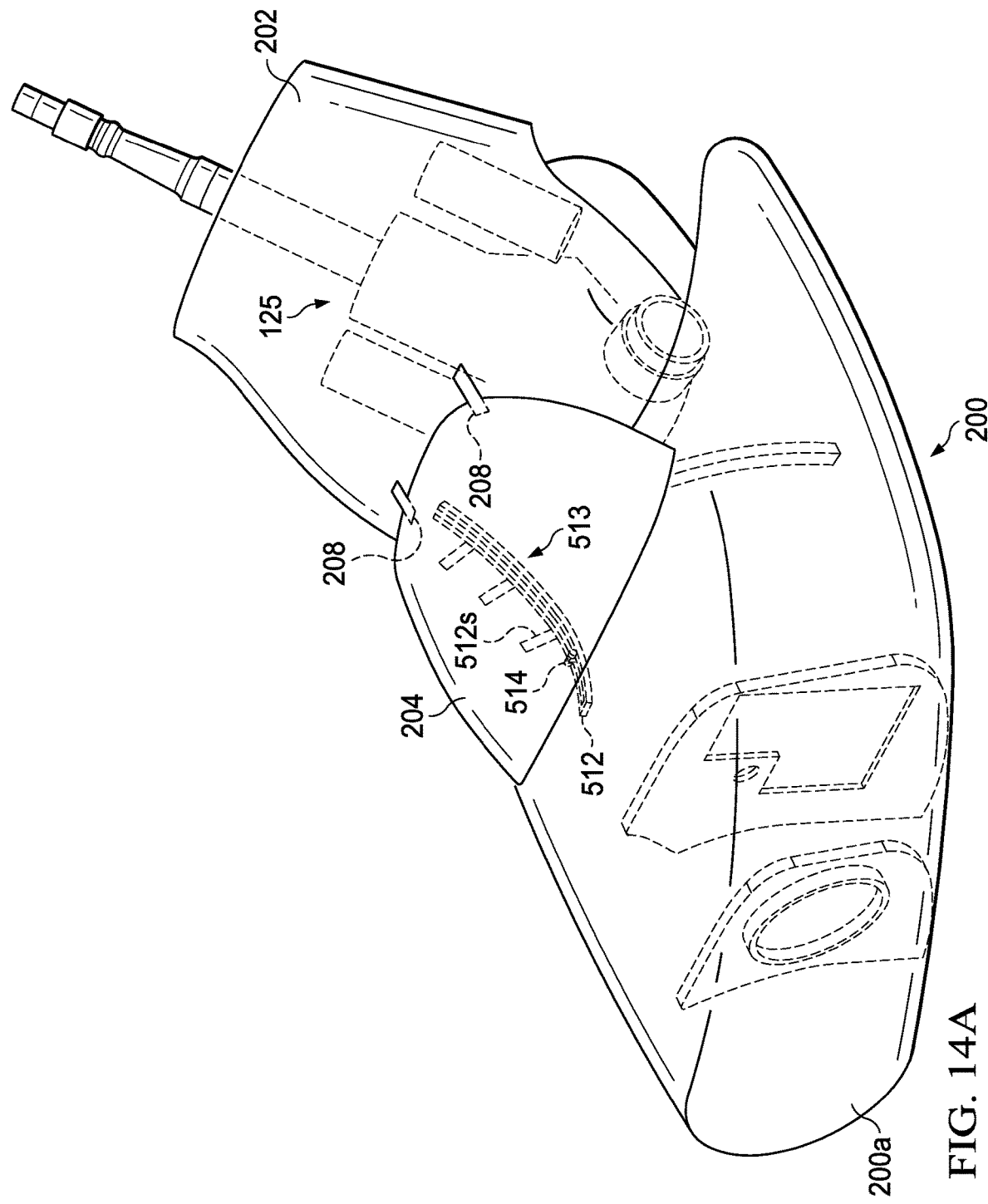
FIG. 14A is a perspective view of a PRGB door with a roller track; according to an exemplary embodiment.
Figure 14B:
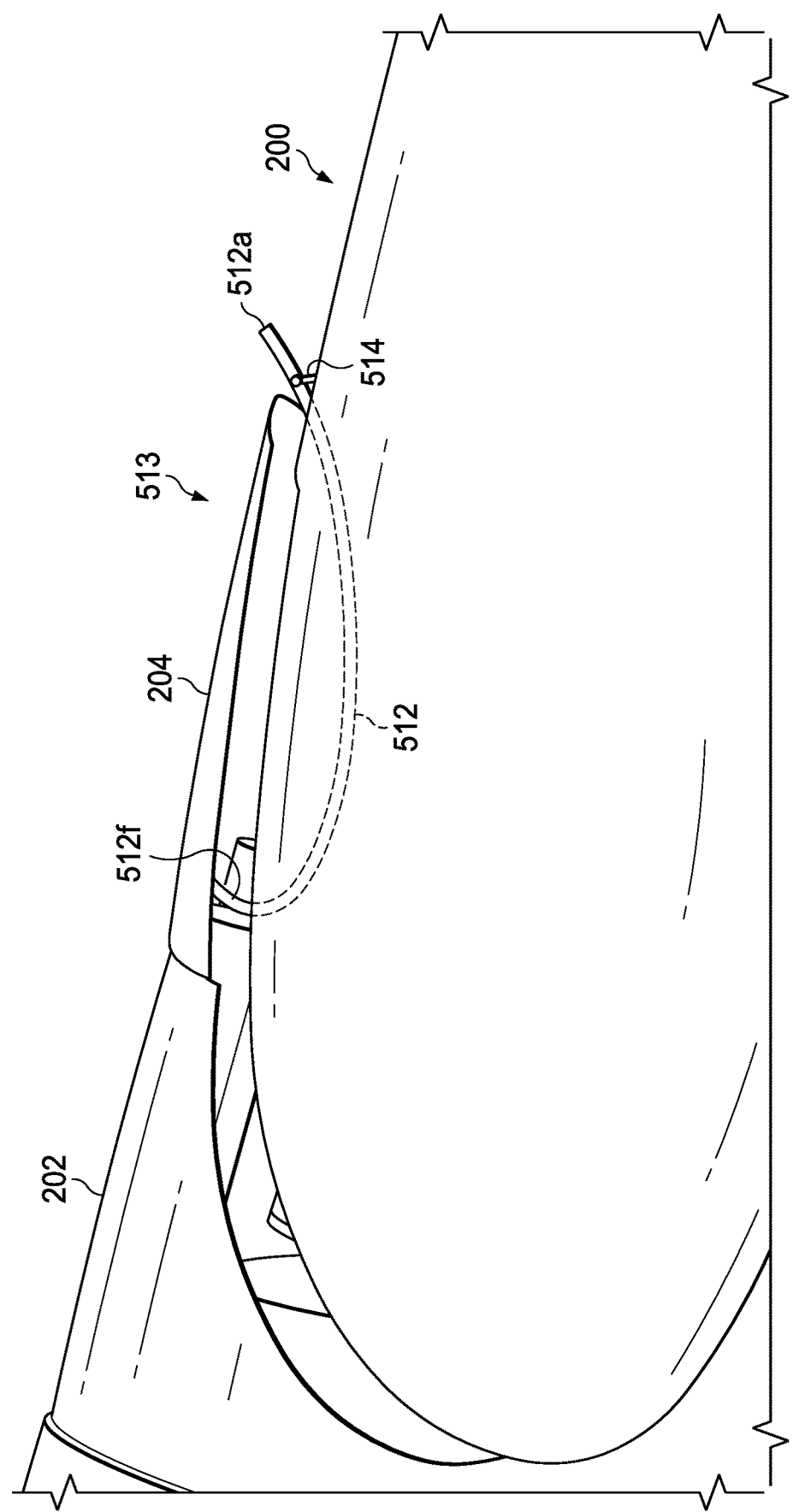
FIGS. 14B-14E are perspective views of a PRGB door with a roller track and a nacelle with a roller mechanism converting from forward flight mode to vertical flight mode, according to exemplary embodiments.
Figure 14C:
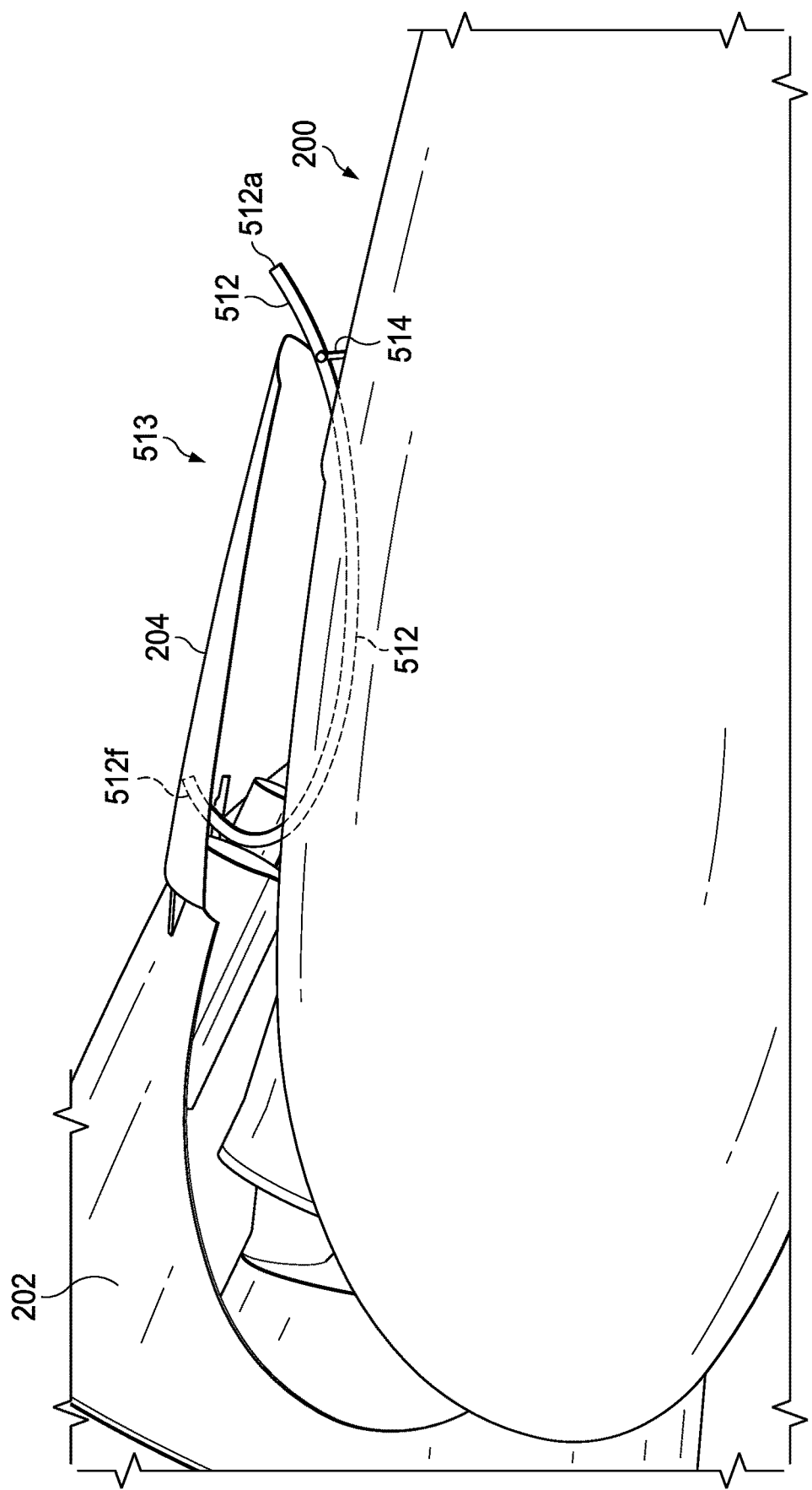
Figure 14D:
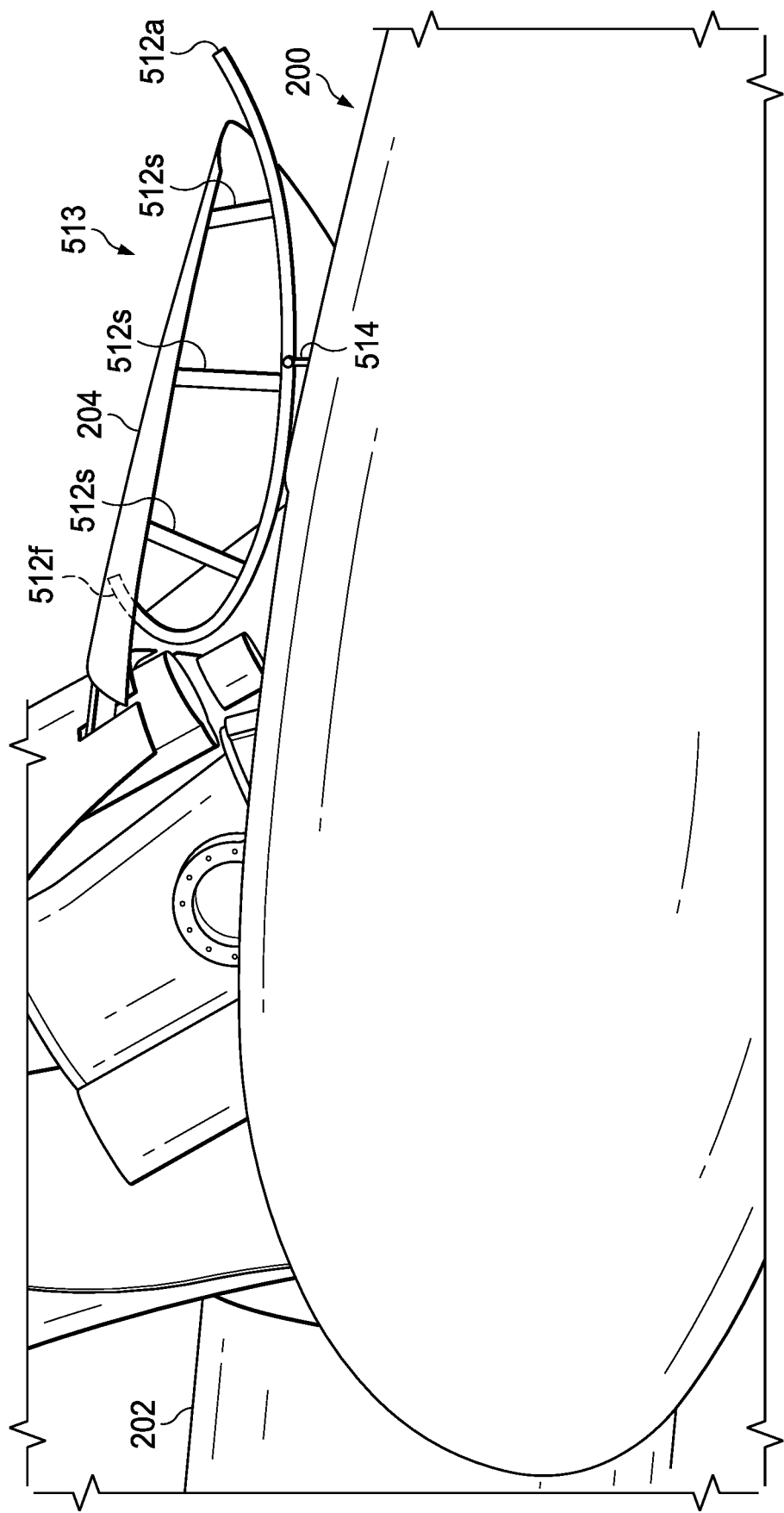
Figure 14E:
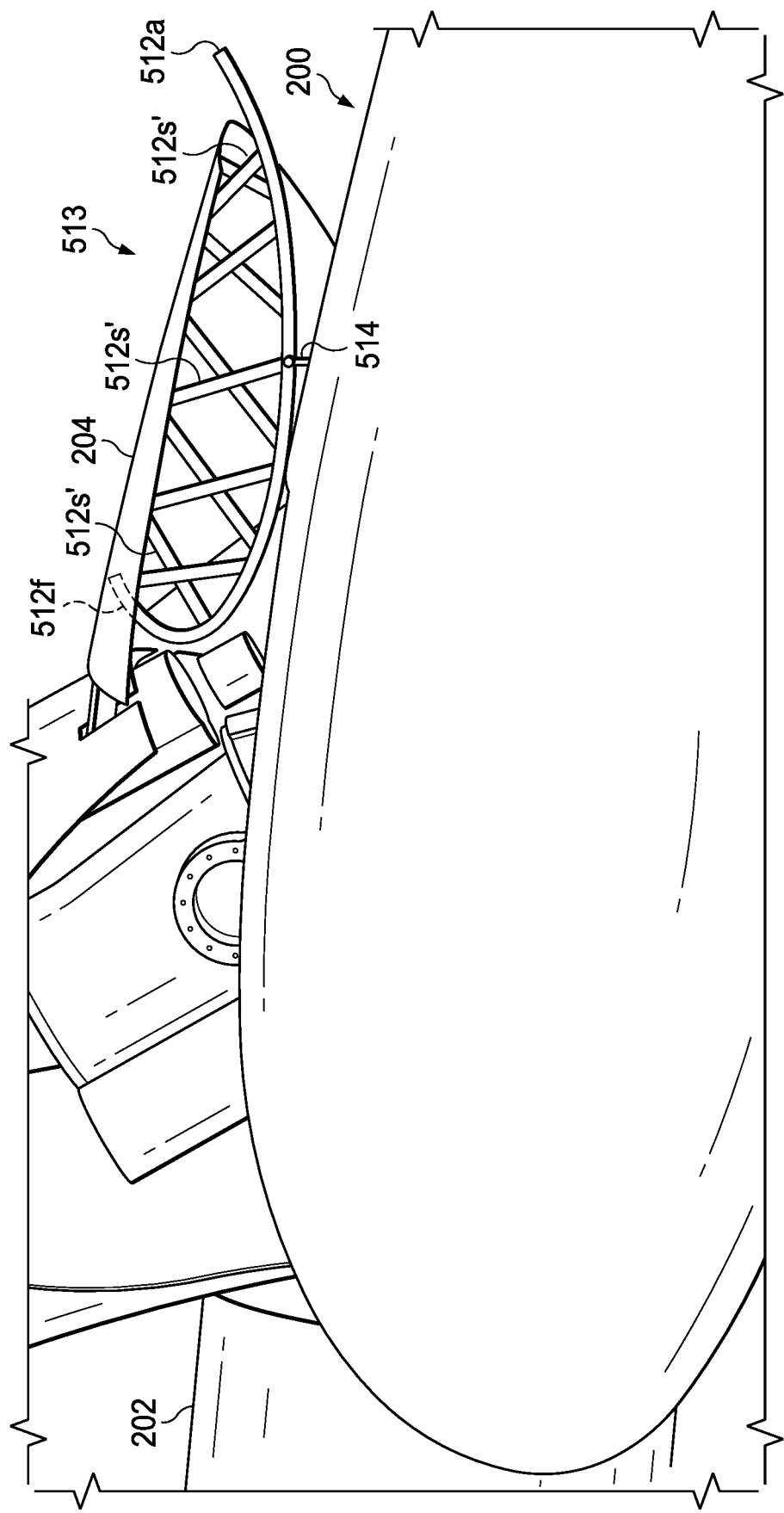

Referring now to FIGS. 14A-14F, another embodiment of linkage 513 is illustrated. Linkage 513 includes a roller track 512 fixedly mounted to door 204 and a roller mechanism 514 fixedly mounted to the nacelle 200. Roller track and roller mechanism 512, 514 are substantially similar in form and function to the roller track and door roller mechanism 214, except as noted herein. In the illustrated embodiment, roller track 512 moves with door 204 as door 204 rotates into an open position 62, 64 and rides on roller mechanism 514. A forward portion 512*f* of the roller track 512 is mounted to an interior surface in the forward portion 204*f* of door 204 by conventional fasteners thereto (e.g., adhesives, screws, bolts). Roller track 512 can be rigidly connected to door 204 by intermediate supports 512*s* connecting the two, as shown in FIGS. 14A and 14D, or a web of intermediate supports 512*s'* between the door interior surface and the track 512, as shown in FIG. 14E.

Figure 14F:
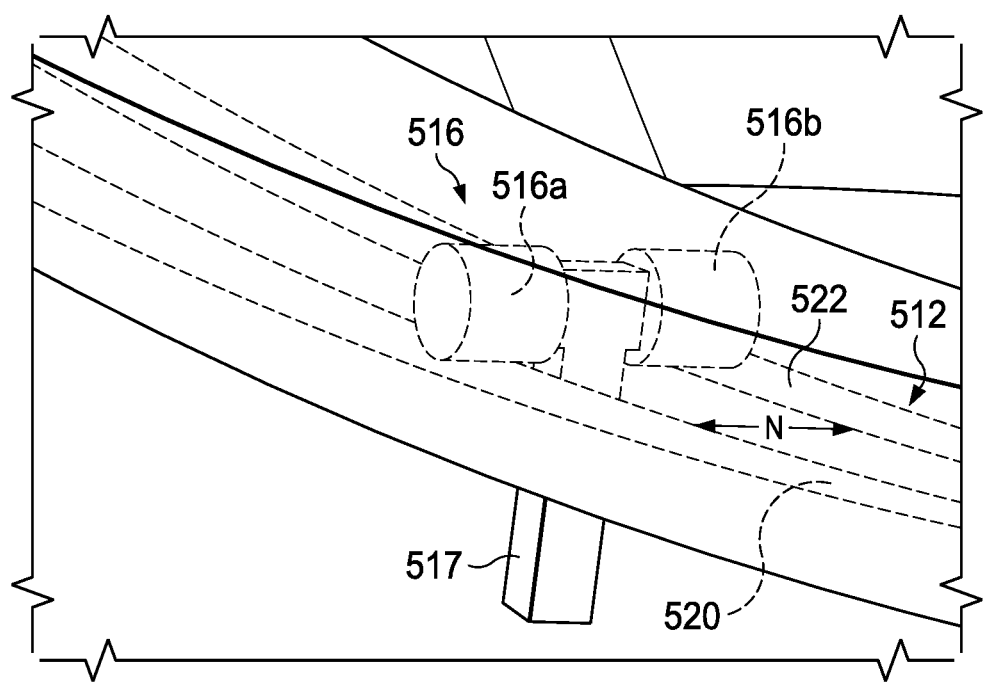
FIG. 14F is a perspective view of a roller mechanism engaged with a roller track, according to an exemplary embodiment.

In an exemplary embodiment, the roller mechanism 514 rolls within the track 512 attached to the door 204 such that the forward hinges 208 move the proprotor housing 202 and drive the door 204 and track 512 through the fixed roller mechanism 514. This forces an orientation of the door 204 as it moves aft with the proprotor housing 202. The geometry of track 512 is defined to control the orientation of the door 204 for a desired aerodynamic profile and to avoid contact with adjacent structure as it moves. In an exemplary embodiment, as proprotor housing 202 rotates to a non-horizontal position 52, 54, door 204 pivots at hinge fittings 208 and track 512 moves with door 204 being retained by the roller mechanism 514. In an exemplary embodiment, as shown in FIG. 14F, track 512 can include a first and second tracks 520, 522 that define a channel N for receiving shaft 517 of roller mechanism 514. The end of aft portion 512*a* of the roller track 512 is connected to the roller mechanism 514 when door 204 is approaching or in a closed position, as shown in 14B.

Roller mechanism 514 includes at least one roller 516 rotatably connected to a shaft 517, as shown in FIG. 14F. Roller 516 can include a first and second rollers 516*a*, 516*b* that the first and second tracks 520, 522 ride on during movement of door 204. In an embodiment, a second set of rollers similar to the first and second rollers pair of rollers 516*a*, 516*b* can be disposed below rollers 516*a*, 516*b* to further constrain the path of the track and provide rigidity to the structure. In an embodiment, rollers 516*a*, 516*b* can dampen vibrations from door 204. Shaft 517 can be mounted on the base 200*s* of the nacelle 200 using conventional fasteners (e.g., adhesives, screws, bolts).

Figure 15A:
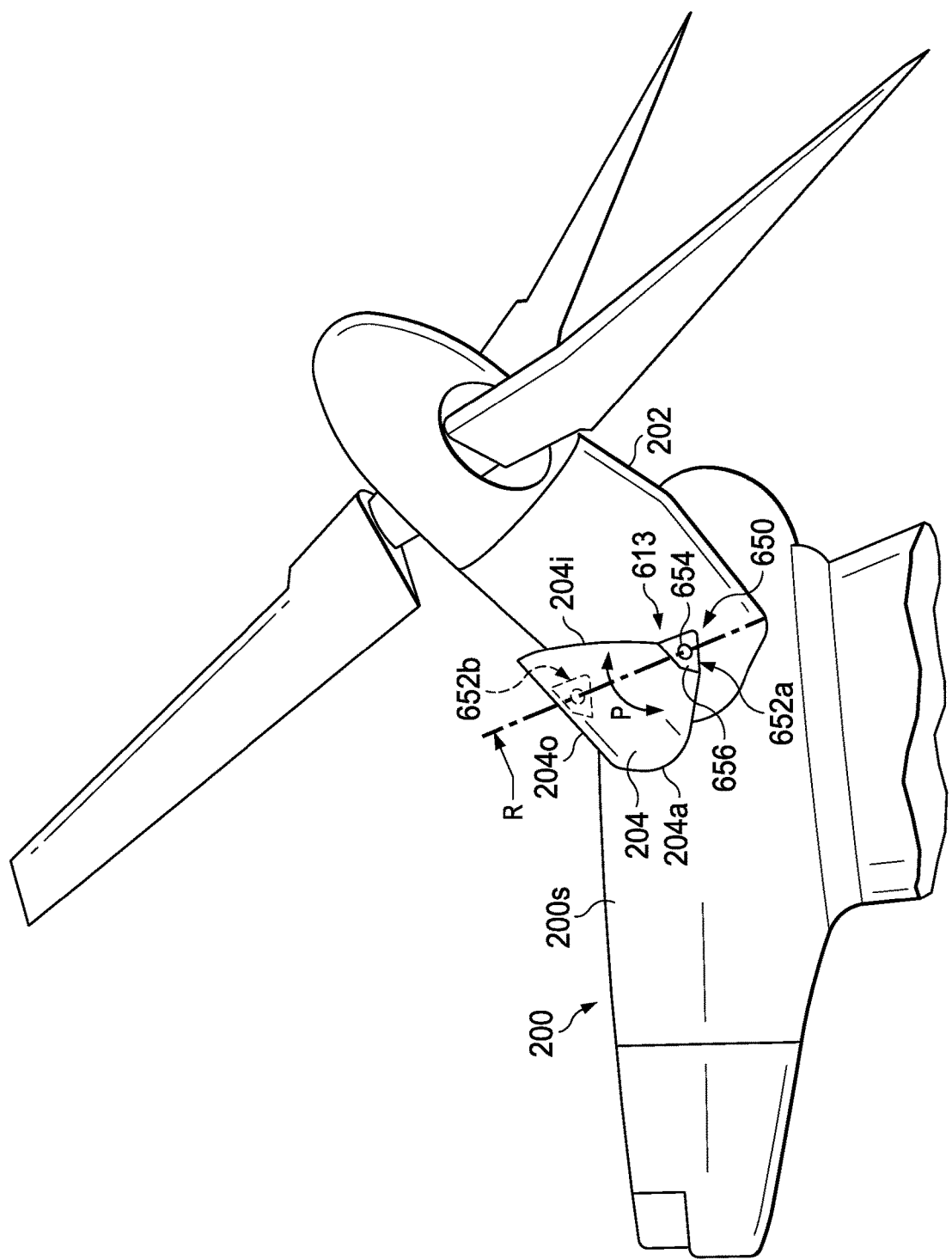
FIGS. 15A-15B are perspective views of a PRGB door pivotally connected to the proprotor pylon, according to exemplary embodiments.

Referring now to FIG. 15A, an embodiment of linkage 613 is illustrated. Linkage 613 can be a hinge member 650 that pivots in a pivot direction P as the proprotor housing 202 rotates. Hinge member 650 can include first and second hinge joints 652*a*, 652*b* each including a hinge pin 654 rigidly attached to and extend from proprotor housing 202. Hinge pin 654 is configured to engage with one or more bearings 656 attached to the inboard or outboard side 204*i*, 204*o* of the door 204. Thus, first and second hinge joints 652*a*, 652*b* are oriented to rotate about a rotation axis R to permit door 204 to pivot about hinge pins 654 when proprotor housing 202 is in a non-horizontal position. First and second hinge joints 652*a*, 652*b* can be disposed on outboard and inboard sides of door 204 to hingedly couple door 204 to proprotor housing 202.

It will be appreciated that the contemplated embodiment shown in FIG. 15A is configured to allow pivoting movement of door 204 at hinge member 650 from about 0 degrees to 90 degrees relative to the longitudinal axis of the proprotor housing 202. The pivot movement of the hinge member 650 can permit the door 204 to rotate behind the proprotor housing 202 when in a non-horizontal position and retains the door 204 when the proprotor housing 202 is in a horizontal position. When the proprotor housing 202 is in a vertical position 54, the door is generally in a 90 degrees orientation and the nacelle base portion 200*s* functions as a backstop that the aft end 204*a* rests thereon. In some embodiments, the nacelle base portion 200*s* can include a reinforced portion for the load and/or sliding of the door 204 (e.g., a local rub strip of metal or Teflon) thereon and to limit wear on the nacelle base portion 200*s*.

Figure 15B:
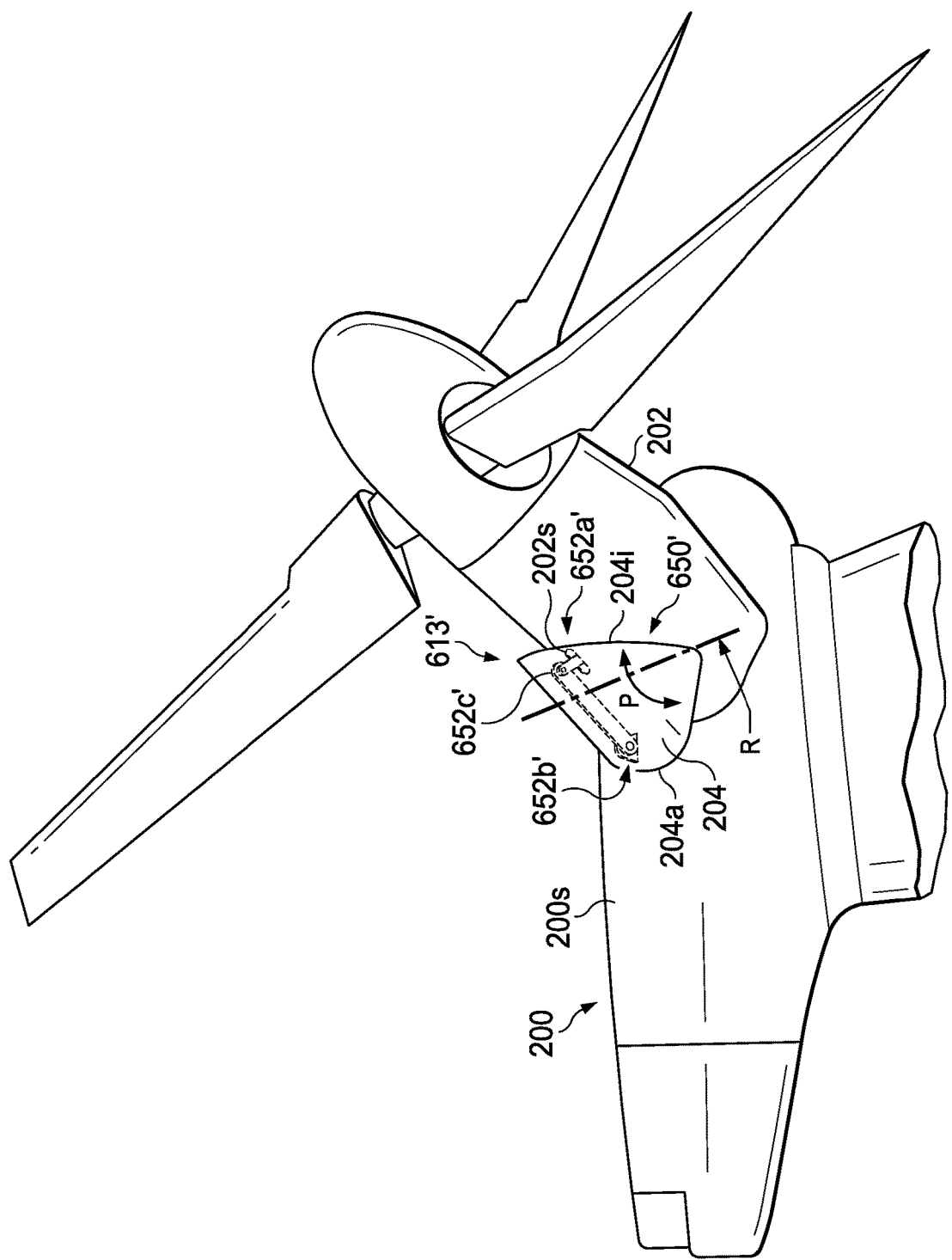

Referring now to FIG. 15B, another embodiment of linkage 613' is illustrated. Linkage 613' can be a hinge member 650' that pivots in a pivot direction P as the proprotor housing 202 rotates. Hinge member 650' can include first and second hinge joints 652*a'*, 652*b'* disposed on opposite ends of arm 652*c'*. First hinge joint 652*a'* can be adjacent to the forward portion of door 204 and is configured to be at least partially in a slot 202*s* in the proprotor housing 202 for moving therewith. Second hinge joint 652*b'* is coupled to the forward edge of the nacelle base portion 200*s* and adjacent to the aft portion of door 204. First and second hinge joints 652*a'*, 652*b'* extend respectively from the proprotor housing 202 and the nacelle base portion 200*s*. Arm 652*c'* can be coupled to the interior surface of the door 204 and is configured to impart movement from the first hinge joint 652*a'* to second hinge joint 652*b'* when proprotor rotates about rotation axis R. When proprotor housing 202 moves upward, the linkage 613' causes door 204 to rotate generally vertically. When proprotor housing 202 moves downward, the linkage 613' causes door 204 toward a horizontal position.

It will be appreciated that the contemplated embodiment of linkage 613' is configured to allow pivoting movement of door 204 at hinge member 650' from about 0 degrees to 90 degrees relative to the longitudinal axis of the proprotor housing 202. The pivot movement of the hinge member 650' can permit the door 204 to rotate behind the proprotor housing 202 when in a non-horizontal position and retains the door 204 when the proprotor housing 202 is in a horizontal position. When the proprotor housing 202 is in a vertical position 54, the door 204 is generally in a 90 degrees orientation.

Linkages 613, 613' are exemplary embodiments of hinge members that can be used to move door 204 when the proprotor housing 202 is in a non-horizontal position. It should be appreciated that linkages 613, 613' may take on a wide variety of hinge configurations and the hinges can be located at various positions on the proprotor housing 202 and/or nacelle 200. Linkage 613, 613' can advantageously provide a mechanical connection that can prevent or minimize mechanical seizure (e.g., binding).

Figure 16:
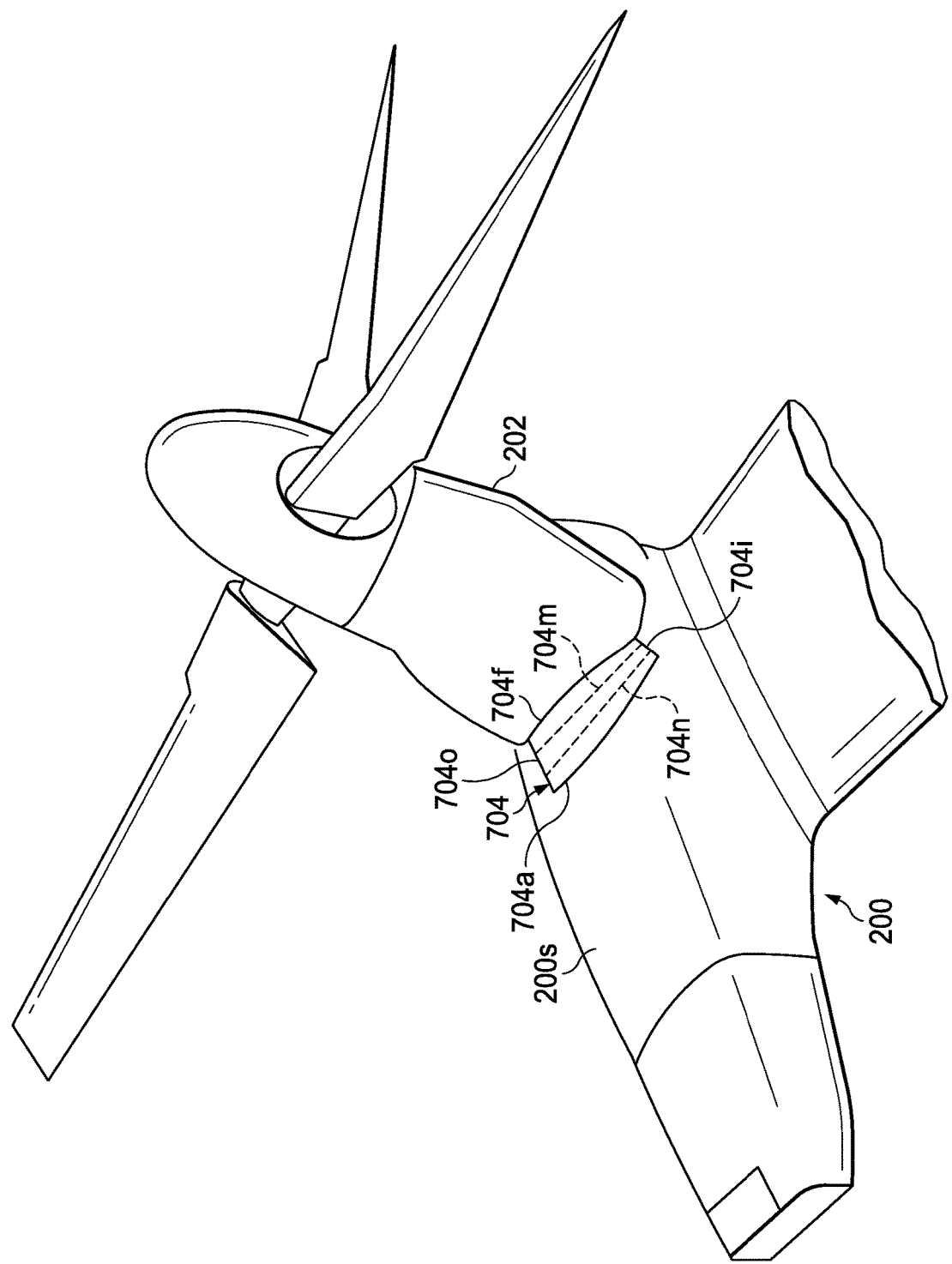
FIG. 16 is a perspective view of a flexible PRGB door, according to an exemplary embodiment.

Referring to FIG. 16, an embodiment of door 704 is illustrated that includes a flexure portion 704*m*, 704*n*. A forward portion 704*f* of door 704 is fixedly connected to the aft portion 202*a* of proprotor housing 202 and an aft portion 704*a* of door 704 is fixedly connected to the base portion 200*s* of the nacelle 200. In one embodiment, the flexure portions 704*m*, 704*n* bend and can permit the door 704 to fold on itself in response to rotation of the proprotor housing 202 in a non-horizontal orientation 50, 52. Flexure portions 704*m*, 704*n* extend and are generally oriented horizontally, straight, and/or planar when proprotor housing 200 is a horizontal orientation 50, 52.

Flexure portions 704*m*, 704*n* can be disposed in the forward and aft portions 704*f*, 704*a* of the door 704. It is contemplated that there can be more or less flexure portions 704*m*, 704*n* (e.g., one, three, four, five, six, seven, eight, nine, or more flexure portions 704*m*, 704*n*) that can be oriented in various configurations to permit folding of door 704 during rotation of proprotor housing 202 in a non-horizontal position. In an embodiment, the flexure portions 704m, 704n can permit rolling of the door 704 onto a spindle associated with the proprotor housing 202 and/or the nacelle 200 to collect excess material.

In some embodiments, at least one flexure portion 704m, 704n can be a composite material. The composite material can be comprised of a matrix material and a reinforcement material. The reinforcement material can comprise a plurality of reinforcement layers configured to provide flexibility to the door 704 such that at least part of the composite material may fold, bend, or roll in response to rotation of the proprotor housing 202. In some embodiments, the entire door 704 is comprised of a composite material that can include flexure portions 704m, 704n.

In an embodiment, at least one flexure portion 704m, 704n can be a fabric, textile, and/or an e-textile. The e-textile can be a smart fabric that is a fabric with digital components and electronics embedded therein to adjust a property of the fabric. In a particular embodiment, the e-textile can be configured to permit flexure portions 704m, 704n to bend when proprotor housing 202 is in a non-horizontal position. Also shrinkage of the e-textile is possible to keep the material taunt for maximum aerodynamic and sealing benefit. In an embodiment, door 704 is comprised entirely of a fabric, textile, and/or e-textile.

An embodiment provides that at least one flexure portion 704m, 704n is a rigid material that is configured to be folded onto itself. In some embodiments, flexure portions 704m, 704n can include a hinge joint. The hinge joint can include a plurality of hinges along the flexure portion 704m extending from the outboard and inboard sides 704o, 704i of the door 704. In some embodiments, door 704 is made from a rigid composite or metallic material including the flexure portions 704m, 704n.

Figure 17A:
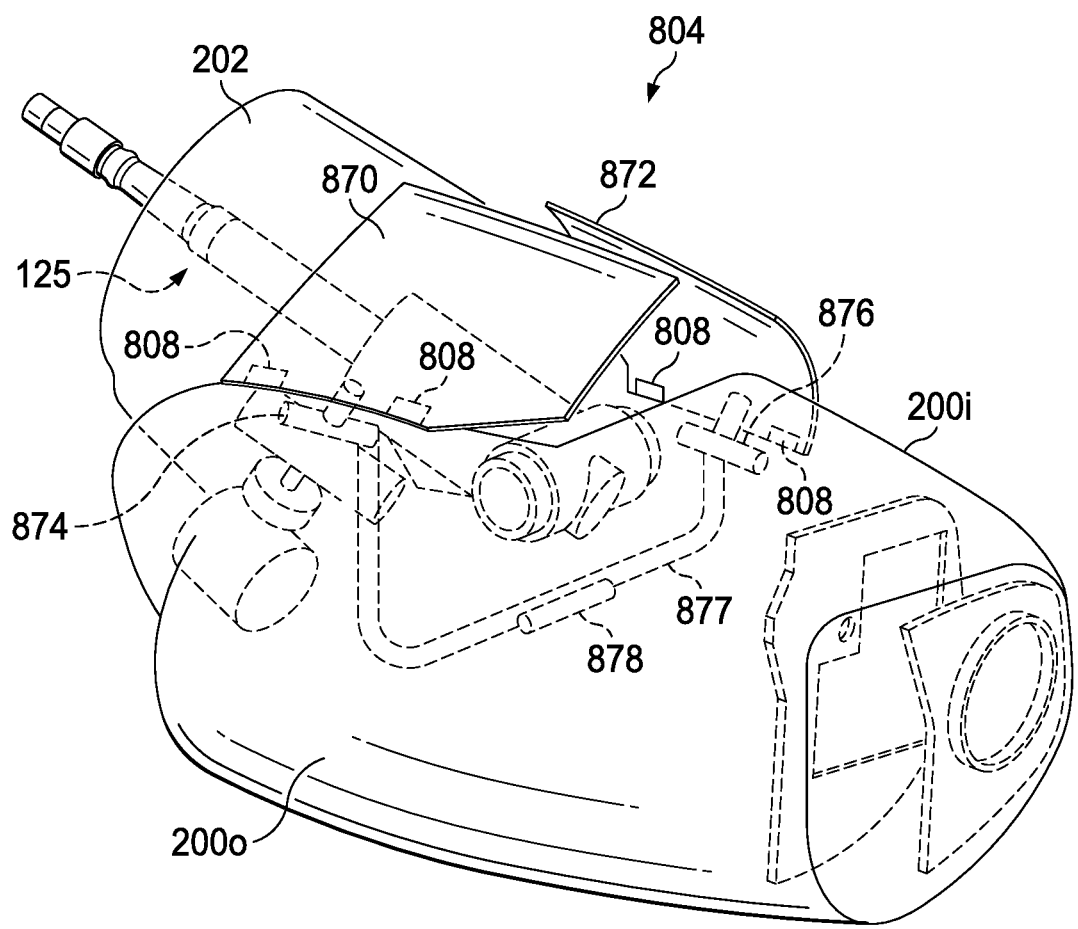
FIGS. 17A-17B are perspective views of a pair of PRGB doors, according to exemplary embodiments.

Referring now to FIG. 17A, an embodiment including a plurality of doors 804 is illustrated. The plurality of doors 804 includes a first door 870 and a second door 872 disposed on the outboard and inboard sides of the nacelle 200, respectively. Each of first and second doors 870, 872 can be folded in to a closed position with first and second doors 870, 872 forming an aerodynamic shape when the proprotor housing 202 is in a horizontal position 50, as shown in FIG. 3A. When proprotor housing 202 is a non-horizontal position, each of first and second doors 870, 872 pivots open at hinge joints 808, as shown in FIG. 17A.

In an embodiment, each of first and second doors 870, 872 can be associated with an actuator 874, 876. Each of the actuators 874, 876 is configured to open and close first and second doors 870, 872, respectively, when the proprotor housing 202 is in a non-horizontal position. In an embodiment, each actuator 874, 876 can be a linear actuator, a rotary actuator, or still another type of actuator that may be powered hydraulically, electrically, or still otherwise powered. In a particular embodiment, each of the actuator mechanisms 874, 876 can be linked to the PRGB gearbox 125. The PRGB gearbox 125 can mechanically drive the actuators 874, 876.

In another embodiment, the first and second doors 870, 872 can be ganged together by an interconnect shaft 877 to provide for even opening and closing. In an embodiment, interconnect shaft 877 can be coupled to an actuator 878, which can rotate interconnect shaft 877 to open and close the first and second doors 870, 872. Actuator 877 can be a linear actuator, a rotary actuator, or still another type of actuator that may be powered hydraulically, electrically, or still otherwise powered. In a particular embodiment, actuator 878 can be a hydraulic cylinder disposed in the middle of the first and second doors 870, 872 that can open and close the doors 870, 872 through a toggle linkage.

Figure 17B:
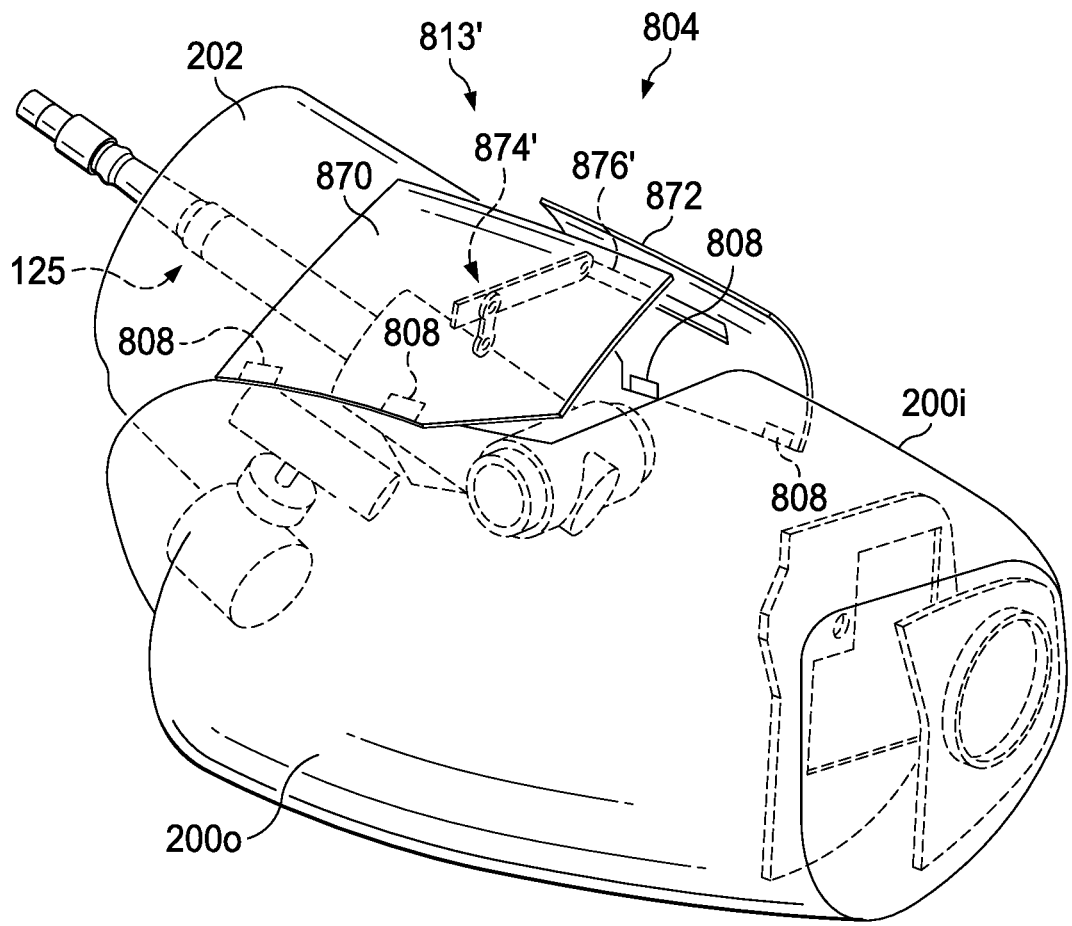
Figure 17C:
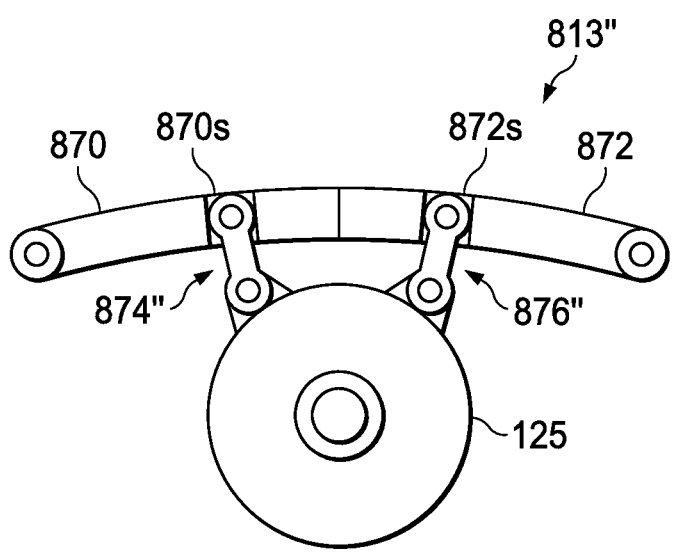
FIG. 17C is a schematic cross-sectional view of a linkage for a pair of PRGB doors, according to an exemplary embodiment.

Still in other embodiments, shown in FIGS. 17B-17C, the first and second doors 870, 872 are configured to open and close with the proprotor housing 202 or PRGB gearbox 125 with a sliding door linkage 813'. In an embodiment, first and second doors are mechanically connected via the door linkage 813' to the proprotor housing 202 or gearbox 125 such that first and second doors 870, 872 flip open when the proprotor housing 202 is in a non-horizontal orientation 52, 54 and flip closed when in a horizontal orientation 50. In an exemplary embodiment shown in FIG. 17B, door linkage 813' includes a first sliding member 874' and a second sliding member 876'. Each of first and second sliding members 874', 876' are associated with the first and second doors 870, 872, respectively (e.g., first and second sliding members 874', 876' can be movably connected to the interior surface of the first and second doors 870, 872). At least one of or both of the first and second sliding members 874', 876' are movably connected to the proprotor housing 202 or PRGB gearbox 125 such that as the proprotor housing 202 moves in a non-horizontal orientation, first and second sliding members 874', 876' move at least partially away or toward each other; thus, opening and closing the first and second doors 870, 872 therewith.

In another embodiment, shown in FIG. 17C, sliding door linkage 813" can include a first pinned linkage 874" and a second pinned linkage 876" each associated with a slot 870s, 872s in the first and second doors 870, 872, respectively. As the proprotor housing 202 pivots upward and downward, each of the pinned linkages 874", 876" slide with the PRGB gearbox 125 in the respective slot 870s, 872s to allow sliding of the first and second doors 870, 782 as the proprotor housing 202 pivots from horizontal orientation 50 to non-horizontal orientations 52, 54. Door linkage 813" can advantageously provide a close connection between proprotor housing 202 and first and second doors 870, 872 and can prevent or minimize mechanical seizure (e.g., binding).

It should be understood that a wide variety of a plurality of doors 804 and passive and active mechanisms for opening and closing the plurality of doors 804 may be utilized; for example, and not limitation, similar to bomb bay doors and mechanisms including a hydraulic cylinder disposed in the middle of the first and second doors 870, 872 that toggles the doors open and closed.

Practice of certain embodiments are advantageous for use with the doors of a tiltrotor aircraft of the type described to dampen vibrations from the proprotor housing 202. However, the embodiments herein are not limited to practice in connection with tiltrotor aircraft doors and can be practiced with respect to other door applications for aircraft, helicopters, and other non-aircraft vehicles to dampen unwanted vibrations.

Figure 18A:
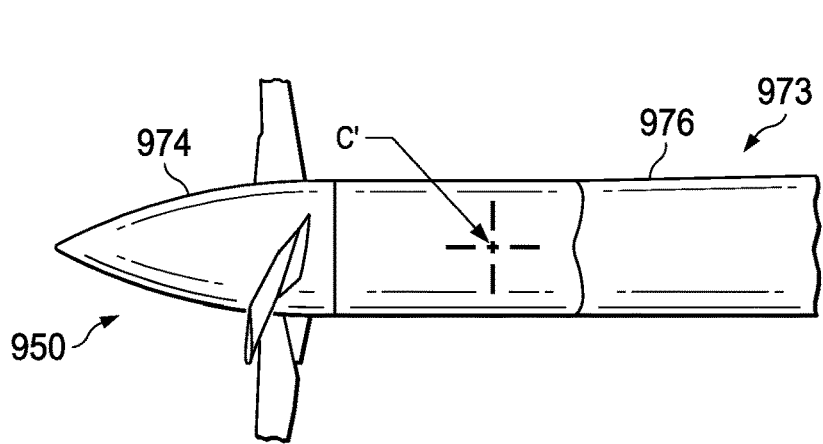
FIGS. 18A-18B are side views of a proprotor pylon having a center of rotation in-line with the wing pivoting on a cantilevered spindle but a fixed aft pylon fairing converting from forward flight to vertical flight.
Figure 18A:
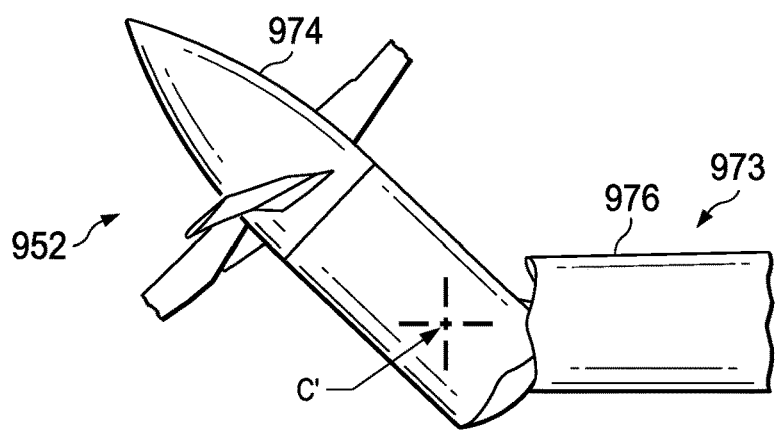
Figure 18A:
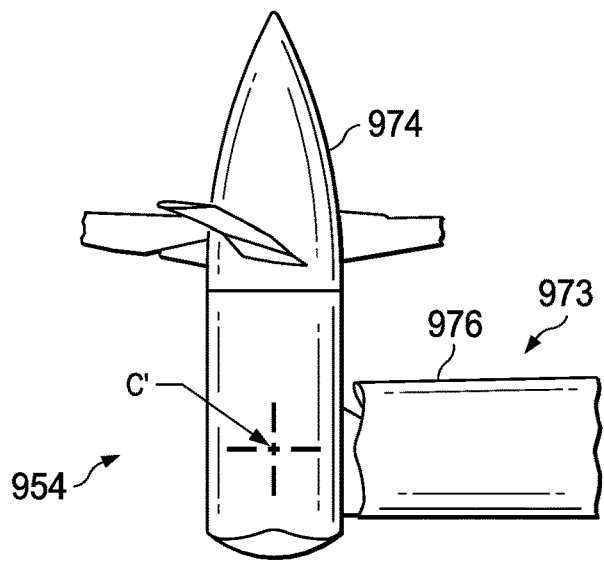
Figure 18B:
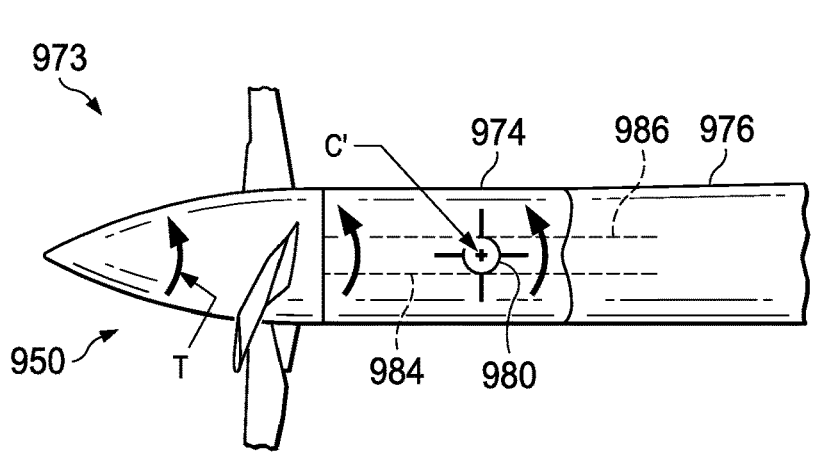
Figure 18B:
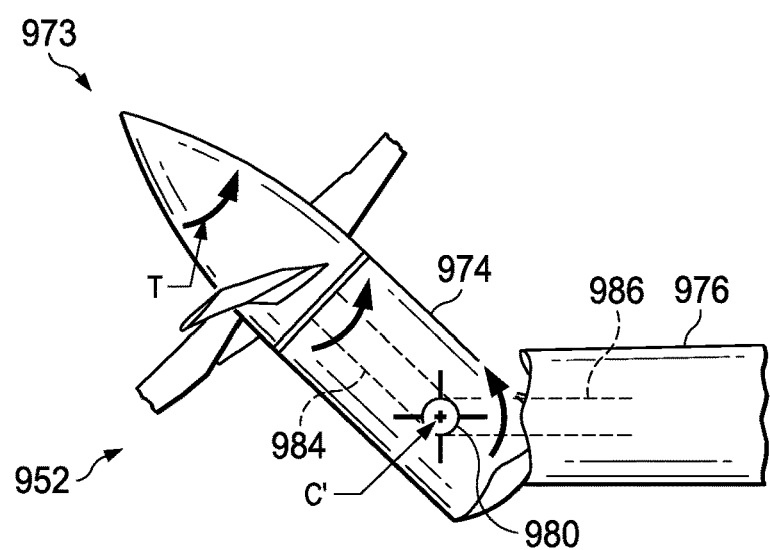
Figure 18B:
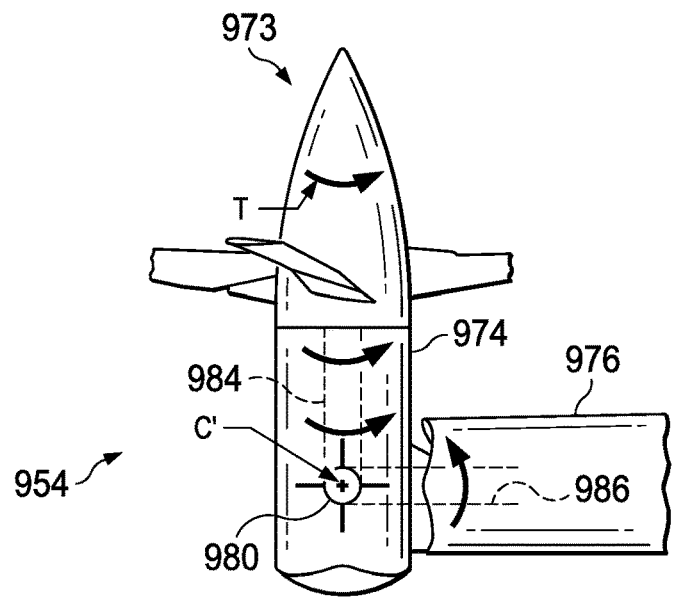
Figure 19:
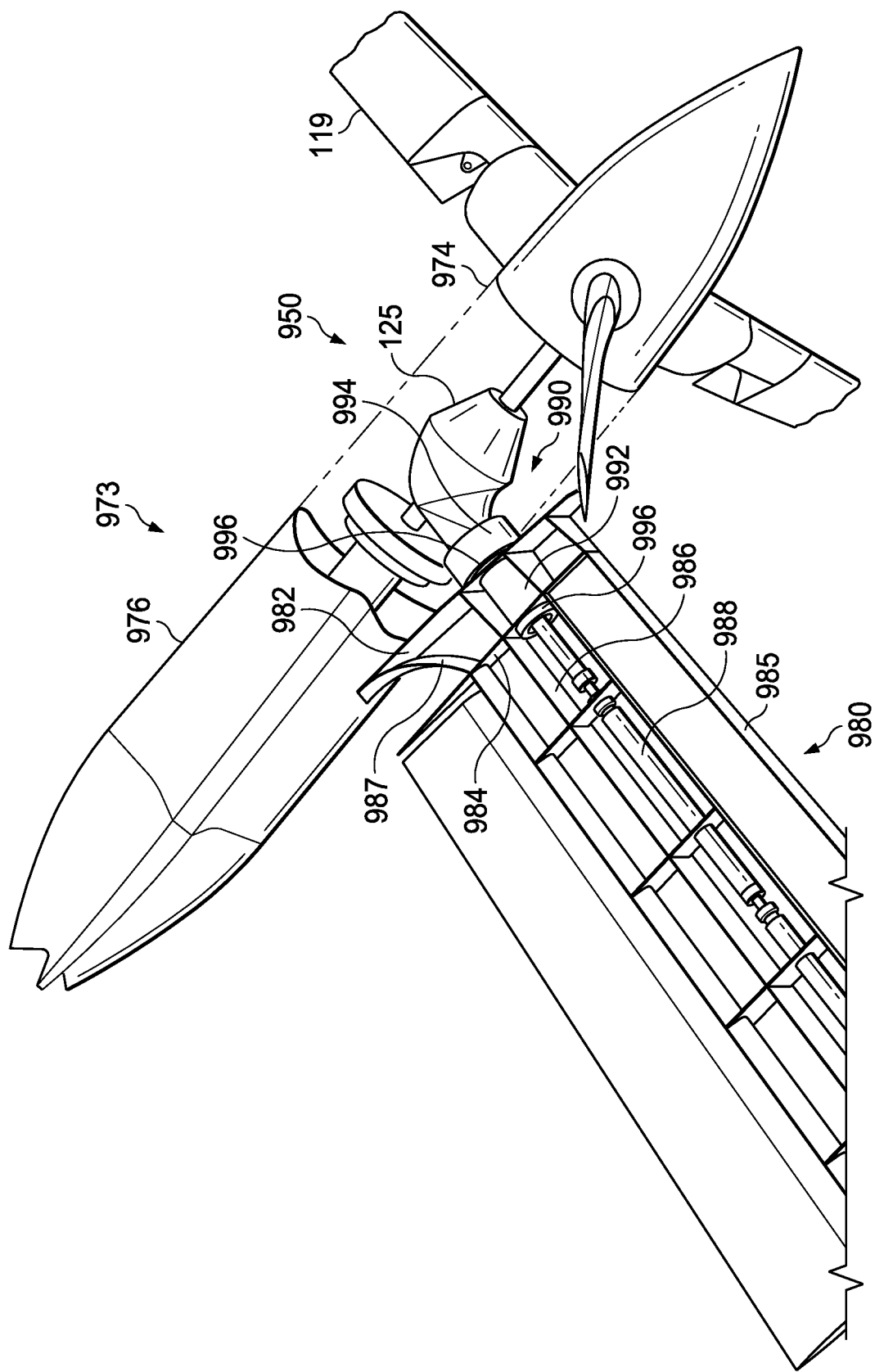
FIG. 19 is a schematic illustration of a pivot mechanism including the cantilevered spindle for the proprotor pylon in FIGS. 18A-18B, according to one example embodiment.

Referring now to FIGS. 18A-18B and 19, a proprotor 973 for a propulsion system 111 is illustrated. Proprotor 973 is similar in form and function to the proprotor housing 202, except as noted herein. Proprotor 973 can be coupled to a nacelle 200. Proprotor 973 can include a forward portion 974 and an aft portion 976. The forward portion 974 includes a plurality of rotor blades 119 and gearbox 125. Forward portion 974 is configured to selectively pivot between a horizontal orientation and a non-horizontal orientation about a conversion axis C, as shown in FIGS. 18A-18B. When the forward portion 974 is in a non-horizontal orientation 952, 954, the aft portion 976 is in a horizonal orientation. In an embodiment, the conversion axis C is disposed in the forward portion 974 of the proprotor 973. When the forward portion 974 is in a horizontal orientation 950, the aft portion 976 is in a horizontal orientation.

Proprotor 973 can be disposed on an outboard end of a wing member 980. Wing member 980 includes a first rib 982 and a second rib 984. In an exemplary embodiment, first rib 982 is the most outboard rib of the wing member 980. Wing member includes a forward spar 985, an aft spar 986, and a cove spar 987. An interconnect drive shaft 988 is disposed between the forward spar 985 and aft spar 986. The interconnect drive shaft 988 provides a torque path that enables a single engine to provide torque to both proprotors 111 and 113 in the event of a failure of the other engine. In the embodiment, the second portion 976 is rigidly attached to the aft spar 986 and cove spar 987 and remains in horizontal position while the forward portion 974 can be in horizontal 950 and non-horizontal orientations 952, 954.

A pivot mechanism 990 pivots the forward portion 974 between horizontal and non-horizontal orientations 950, 952, 954. The pivot mechanism 990 includes a cantilevered spindle 992 and an actuator 994. In an exemplary embodiment, the cantilevered spindle is disposed between first rib 982 and second rib 984 and the actuator 994 can be a rotary actuator disposed outboard of first rib 982. Bearings 996 can be associated with the first and second ribs 982 to support the cantilevered spindle 992. To pivot the forward portion 974, the rotary actuator 994 engages the spindle 992. It should be appreciated that pivot mechanism may take on a wide variety of configurations. For example, the forward portion 974 could be mechanically driven by a linear actuator in the outboard end of wing 980.

In some embodiments, proprotor 973 can be coupled to a nacelle 200. In an embodiment, the aft portion 976 of proprotor 973 is a stationary aerodynamic fairing. In other embodiments, the aft portion 976 encloses and supports an engine 123. In an embodiment, proprotor 973 can have a length that is longer than conventional proprotors, e.g., proprotor housing 202.

The illustrative embodiments described herein can advantageously provide a door that covers a recess aft of the proprotor or other aerodynamic configuration during forward flight (horizontal orientation) to reduce drag while maintaining structural integrity and stiffness.

Figure 20:
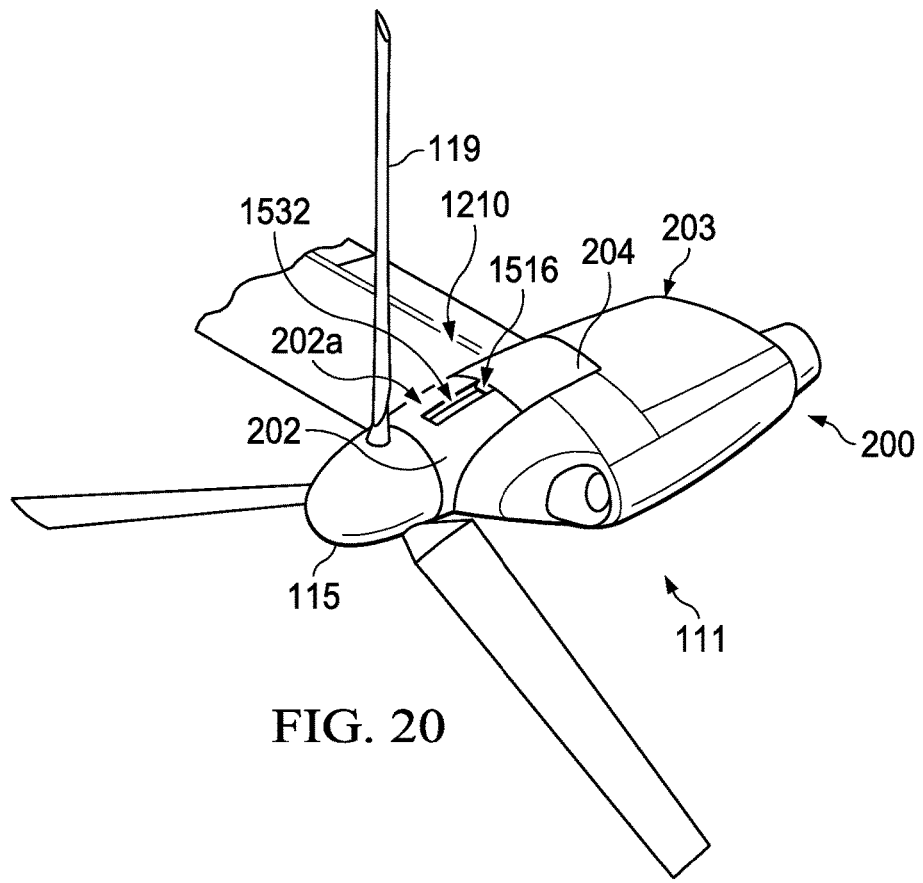
FIG. 20 is a partial perspective view of a nacelle with a door system and a PRGB door in forward flight mode, according to one example embodiment.

Referring now to FIGS. 20-26, an embodiment of a door system 1210 is illustrated. The door system 1210 is designed for the nacelle 200 of a tiltrotor aircraft 101 as shown in FIGS. 1-2 and described herein. In an embodiment, as shown in FIG. 20, the nacelle 200 includes a movable proprotor housing 202 rotatable relative to a fixed portion 203 of the nacelle 200 from a forward flight mode, as shown in FIG. 2, to a vertical flight mode, as shown in FIG. 1. The nacelle 200 includes a proprotor gearbox door 204 connected to the movable proprotor housing 202 and pivotably coupled to the fixed portion 203. The door system 1210 includes a track assembly 1532 mounted to the movable proprotor housing 202 and a door roller mechanism 1514 connected to the proprotor gearbox door 204. The door roller mechanism 1514 traverses the track assembly 1532 during rotation of the movable proprotor housing 202.

Figure 21:
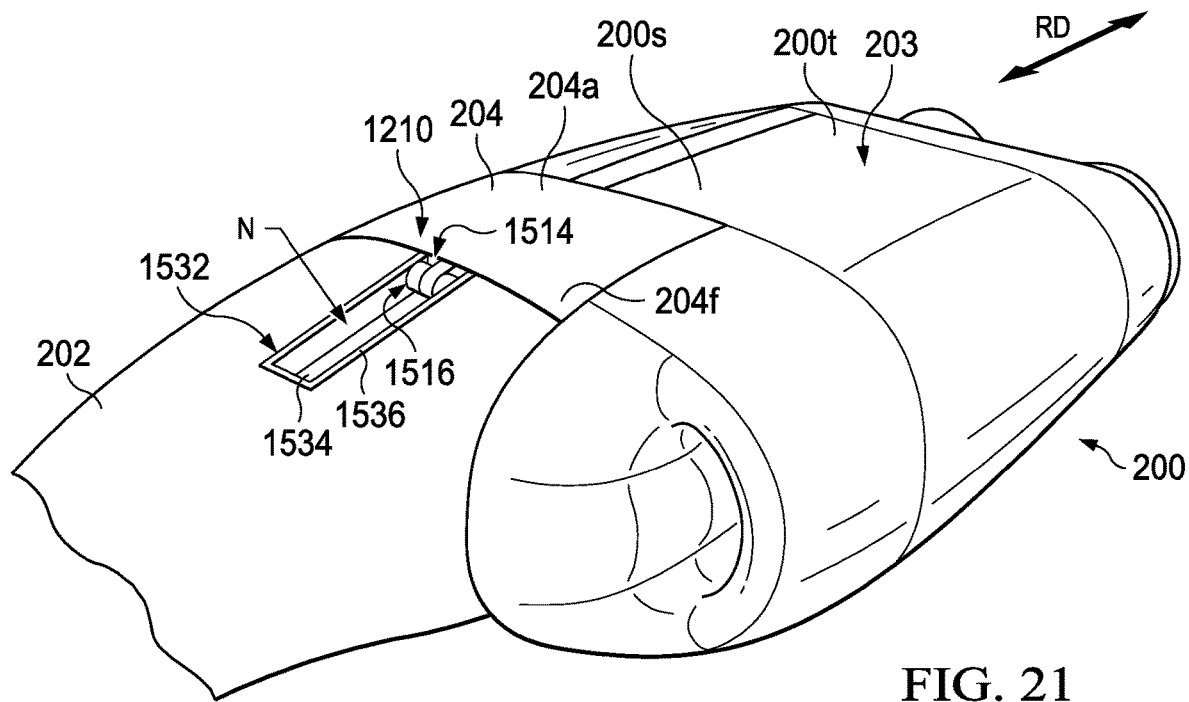
FIG. 21 is a partial perspective view of the door system in FIG. 20.
Figure 22:
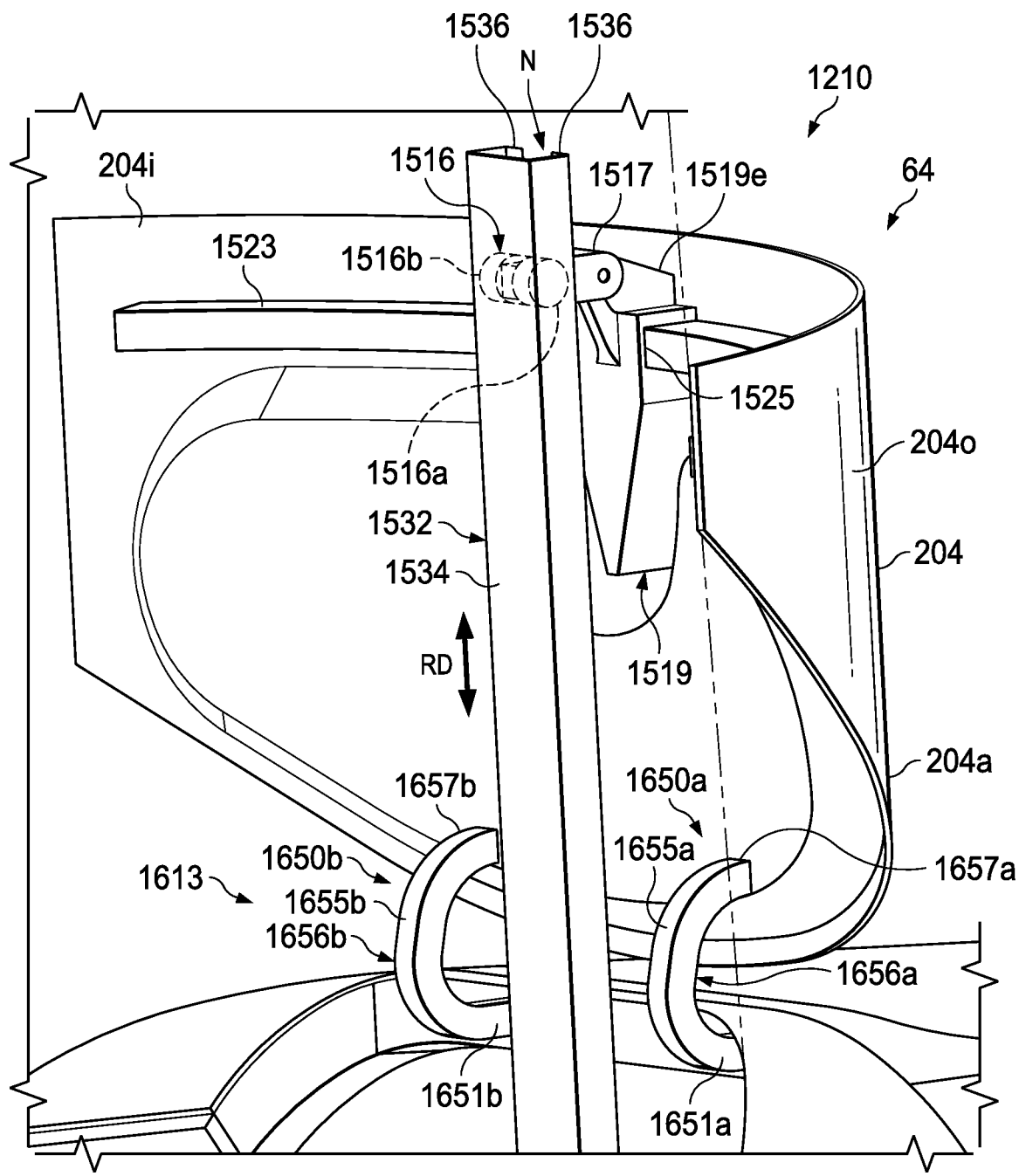
FIG. 22 is a partial section view looking through the movable proprotor housing to the door system in FIG. 20 and the PRGB door in vertical flight mode, according to one example embodiment.
Figure 25:
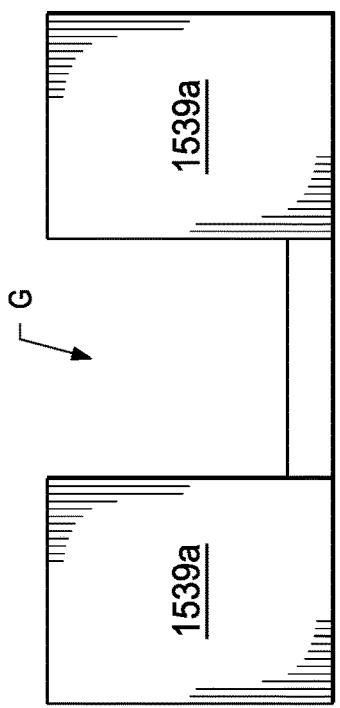
FIG. 25 is a front view of the aft end of the track assembly according to one example embodiment.

In certain exemplary embodiments, shown in FIGS. 22-23, the door system includes a linkage 1613 to pivotably couple the door 204 to the fixed portion 203 of the nacelle 200. The linkage 1613 is disposed in the aft portion 204a of the door 204. In an embodiment, as shown in FIGS. 21-24, the linkage 1613 is comprised of at least one hinge member that pivots in a pivot direction P1 as the proprotor housing 202 rotates. In an embodiment, the at least one hinge member is comprised of a pair of hinge members. In an embodiment, the pair of hinge members is comprised of first and second hinge members 1650a, 1650b. Second hinge member 1650b is substantially identical to first hinge member 1650a; for the sake of efficiency, only the features of the first hinge member 1650a are shown in FIG. 23. However, one of ordinary skill in the art would fully appreciate an understanding of the second hinge member 1650b based on the illustrations in the FIGS. 22-23 and the description herein. First and second hinge members 1650a, 1650b can each include a hinge joint 1652a, 1652b, respectively, with a hinge pin 1654a, 1654b. The hinge joints 1652a, 1652b are disposed on a bracket end 1653a, 1653b and first ends 1651a, 1651b of the respective hinge member 1650a, 1650b. In an embodiment, the bracket ends 1653a, 1653b are disposed on a stationary surface of the fixed portion of the nacelle 200 to hingedly couple door 204 to the fixed portion 203 of the nacelle 200. In an embodiment, the stationary surface is a bottom surface 203s of the fixed portion 203, as shown in FIG. 23. In some embodiments, the stationary surface is a surface on the bulkheads and frames 200 of the fixed portion 203 of the nacelle 200. In an illustrative embodiment, the hinge joints 1652a, 1652b are disposed on a stationary surface in a forward portion of the fixed portion 203 of the nacelle 200.

The hinge members 1650a, 1650b each include a rigid arm portion 1656a, 1656b with first ends 1651a, 1651b and second ends 1657a, 1657b opposite from the respective first ends 1651a, 1651b and a curved portion 1655a, 1655b disposed between the respective first and second ends. The second ends 1657a, 1657b of the hinge members 1650a, 1650b are each rigidly attached to aft portion 204a of the door 204. In an embodiment, the second ends 1657a, 1657b are disposed on the bottoms surface 204s of door 204. The curvature of the curved portion 1655a, 1655b is configured to permit the door 204 to pivot between forward flight mode (e.g., the door 204 is generally horizontal) and vertical flight mode (e.g., the door is generally vertical). In an embodiment, the hinge members 1650a, 1650b are each a gooseneck hinge. It should be noted that hinge members 1650a, 1650b are merely an example of linkage 1613 and other linkage configurations can be implemented. For example, linkage 1613 can be comprised of more or less hinge members (one, three, four, or more) and/or of other joint assemblies capable of pivoting in a pivot direction P1 as the proprotor housing 202 rotates to movably pivotable couple the door 204 to the fixed portion 203 of the nacelle 200.

Referring to FIGS. 21-24, the door roller mechanism 1514 is disposed on the bottom surface 204s in the forward portion 204f of the PRGB door 204. The door roller mechanism 1514 is an assembly that can include at least one roller 1516 rotatably connected to a shaft 1517 associated with door 204 via a support member 1519. The at least one roller 1516 can be comprised of one roller mounted to a first end 1517a of shaft 1517. In an embodiment, at least one roller 1516 can include first and second rollers 1516a, 1516b mounted to shaft 1517. In an embodiment, the roller 1516 is composed of a vibration damping material for damping vibrations from the movable proprotor housing 202 and door 204. In some contemplated embodiments, the at least one roller 1516 can be a rolling element or assembly including at least one of the following bearings supported by a bearing housing, slide bearings, and the like. The at least one roller 1516 can be a comprised of a plurality of rollers 1516a, 1516b arranged in a configuration (triangular, rectangular pattern) that rotate within and/or on track assembly 1532 and can withstand the operational forces exerted on the door 204.

Shaft 1517 can be pivotably mounted via pin 1518 to the support member 1519. In an embodiment, shaft 1517 includes a bracket for receiving pin 1518 therethrough on the second end 1517b. Support member 1519 is disposed on the bottom surface 204s of door 204 and is configured to support a load from the door roller mechanism 1514 (e.g., the shaft 1517 and the roller 1516). The support member 1519 can include an extension member 1519e that extends downward and beyond a base portion 1519b. The extension member 1519e includes an extension bore 1521 to receive pin 1518 therein. The extension member 1519e provides support for the vibration and pivoting forces exerted on door 204 during operation. In some embodiments, the extension member 1519e and the base portion 1519b are configured to withstand operational forces and absorb vibrations that occur during operation. For example, the extension member 1519e and/or base portion 1519b can include an internal hollow portion housing a vibration damping member or material to reduce forces and vibrations on the door 204.

In some embodiments, the support member 1519 can include a brace member 1523 disposed on the bottom surface 204 of door between the inboard side 204i and the outboard side 204o. The brace member 1523 can extend through a brace bore 1525 and is configured for rigidly transferring vibrations between the door 204 and the support member 1519. In some embodiments, brace member 1523 can absorb vibrational forces. Brace member 1523 can be constructed of a rigid and/or flexible structural member (e.g., metal, composite, and/or polymeric material). It should be appreciated that the door roller mechanism 1514 can be modified to include a plurality of brace members 1523. In an alternative embodiment, the support member 1519 and brace member 1523 may be integrated or separate components.

The track assembly 1532 defines a rolling direction RD of the at least one roller 1516 disposed therein. The track assembly 1532 includes at least one track 1534 being a substantially straight guiding structure. The at least one track 1534 includes sidewalls 1535 and a floor 1537 that define a channel N for receiving the roller 1516. The sidewalls 1535 include lip portion 1536 for securing the roller 1516 therein. The at least one track 1534 can include, but is not limited to, rail, bar, conduit, and the like. In some embodiments, the track 1534 is constructed of metallic and/or composite materials. In some embodiments, track assembly 1532 includes a plurality of tracks.

In an embodiment, the track assembly 1532 includes a flange 1538 mounted to exterior surface of the sidewalls 1535 for securing the track assembly to the movable proprotor housing 202. The track 1534 can include an entry end 1539a that is adapted to receive the roller 1516 therein during assembly and to prevent disengagement of the roller 1516. The entry end 1539a can be removable to provide access to the roller 1516 for installation and maintenance. In an embodiment, shown in FIG. 25, the entry end 1539a disposed at the aft portion of the track 1534 are removable and provide a space G to receive the shaft 1517 when in forward flight mode. Opposite to the entry end 1539a is a stopper end 1539b, shown in FIG. 23, disposed at the forward portion of the track 1534 and prevents disengagement of the roller 1516 when in the track is in a vertical flight mode.

Figure 26:
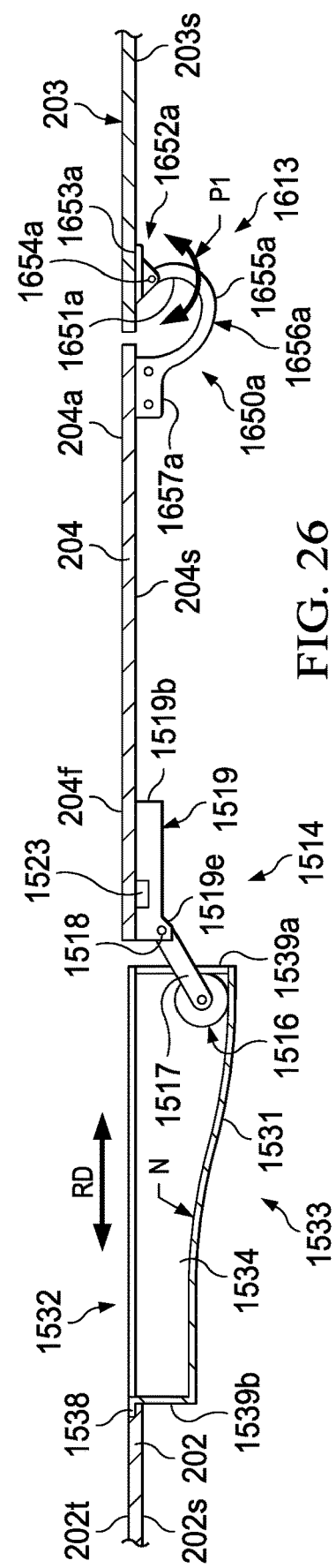
FIG. 26 is a partial schematic side view of the nacelle according to one illustrative embodiment.

In some embodiments, as shown in FIG. 26, the track 1534 can include a curved portion 1533 shaped to complement a curvature of the movable proprotor housing 202 and, in some embodiments, to provide clearance and/or assist the movable proprotor housing 202 as it rotates to a vertical flight mode. In an illustrative embodiment, the curved portion 1533 can include a stowage recess 1531 to stow the roller 1516 and shaft 1517 when in a forward flight mode. In other embodiments, the curved portion 1533 can include an ascending portion and/or a descending portion.

In an embodiment, the movable proprotor housing 202 provides a surface for supporting the track assembly 1532. In an embodiment, as shown in FIG. 23, the track assembly 1532 is mounted to the bottom surface 202s of the movable proprotor housing 202. In other embodiments, the track assembly 1532 is mounted to the top surface 202t of the movable proprotor housing 202. The movable proprotor housing 202 includes a channel opening 202a with two symmetrical sides and an opening at the aft end 202a of the housing 202. In some embodiments, the track assembly 1532 can be mounted to the frame supporting the movable proprotor housing 202 and disposed in the channel opening 202a. In an embodiment, the track assembly 1532 is coupled to the movable proprotor housing 202 using conventional fasteners secured through the flange 1538.

During operation, when in forward flight, the roller 1516 resides in the channel N at the aft end of the track assembly 1532, as shown in FIGS. 20-21 and 23. In an illustrated embodiment, as shown in FIG. 23, the shaft 1517 pivots to a substantially horizontal position to provide a narrow profile in the interior of the nacelle 200.

When the movable proprotor housing 202 is in a non-horizontal position, as shown in FIG. 22, the track assembly 1532 moves therewith, which causes the at least one roller 1516 to roll in a rolling direction RD within the channel N of the track 1534 and causes the linkage 1613 to pivot in a pivot direction P1. The linkage 1613 rotates only at the hinge joints 1652a, 1652b and is otherwise rigid (e.g., rigid portion with curved portion 1655a, 1655b). When the movable proprotor housing 202 is rotating upward, the roller 1516 moves upward within the track 1534 and the door 204 is positioned to at least a partially opened position 62. In vertical flight mode, the proprotor housing 202 has a generally vertical orientation 64, and the roller 1516 is positioned in a forward portion of the track 1532 and the door 204 is in an open position (e.g., generally vertical), as shown in FIG. 22. Conversely, roller 1516 moves downward when the movable proprotor housing 202 is rotated downward. Advantageously the at least one roller 1516 connection with the track 1534 in the movable proprotor housing 202 can reduce some of the vibration transferred to the door 204 because it provides a single attachment point therebetween (as opposed to two attachment points). Similarly, the configuration of the linkage 1613 between the door 204 and the fixed portion 203 of the nacelle 200 serves to limit relative motion between the forward and aft door 204 attachment points.

The door system 1210 advantageously provides a system that slaves the PRGB door 204 to the position of the proprotor housing 202, which allows the door 204 to rotate without requiring additional actuation. In addition, the door system 1210 can facilitate installation and maintenance by having only a primary wear component being the roller 1516 and being located at easy to access and view locations (e.g., personnel can view the primary wear component easily when viewing the top of the proprotor housing 202 in the forward flight mode). Moreover, the door system 1210 is a compact, lightweight system.

It may be advantageous to set forth definitions of certain words and phrases used in this patent document. The term "couple" and its derivatives refer to any direct or indirect communication between two or more elements, whether or not those elements are in physical contact with one another.

The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "proprotor housing" refers to the exterior housing and can refer to internal components (e.g., gearbox 125 and other components) within the proprotor housing 202.

Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A door system for a nacelle of a tiltrotor aircraft, the nacelle including a movable proprotor housing rotatable relative to a fixed portion of the nacelle from a forward flight mode to a vertical flight mode and a proprotor gearbox door connected to the movable proprotor housing and pivotably coupled to the fixed portion, the door system comprising:
    a linkage to pivotably couple the proprotor gearbox door and the fixed portion of the nacelle;
    a track assembly mounted to the movable proprotor housing; and
    a door roller mechanism connected to the proprotor gearbox door;
    wherein the door roller mechanism traverses the track assembly during rotation of the movable proprotor housing.

2. The door system according to claim 1, wherein the linkage comprises of at least one hinge member.

3. The door system according to claim 2, wherein the at least one hinge member is a pair of hinge members.

4. The door system according to claim 2, wherein the at least one hinge member comprises a first end disposed on a stationary surface of the fixed portion of the nacelle and a second end opposite from the first end disposed on the proprotor gearbox door.

5. The door system according to claim 4, wherein the at least one hinge member includes a hinge joint disposed on the first end.

6. The door system according to claim 4, wherein the at least one hinge member includes a curved portion between the first and second ends to permit the proprotor gearbox door to pivot.

7. The door system according to claim 1, wherein the linkage is a gooseneck.

8. The door system according to claim 1, wherein the door roller mechanism comprising at least one roller rotatably connected to a shaft associated with the proprotor gearbox door.

9. The door system according to claim 8, wherein the door roller mechanism comprising a support member disposed on a bottom surface of the proprotor gearbox door, the support member configured to support a load from the shaft and at least one roller.

10. The door system according to claim 9, wherein the support member comprising an extension member extending downward and beyond a base portion.

11. The door system according to claim 10, wherein the extension member and base portions of the support member are configured to absorb vibrations during operation of the aircraft.

12. The door system according to claim 9, wherein the support member further comprises a brace member configured for transferring vibrations between the proprotor gearbox door and the support member.

13. The door system according to claim 1, wherein the track assembly comprises at least one track supported by the movable proprotor housing.

14. The door system according to claim 13, wherein the movable proprotor housing includes a channel opening, the track assembly being disposed in the channel opening.

15. The door system according to claim 13, wherein the at least one track comprises a substantially straight guiding structure.

16. The door system according to claim 13, wherein the at least one track comprises a curved portion to complement a curvature of the movable proprotor housing.

17. The door system according to claim 8, wherein the track assembly comprises a track including a pair of side walls defining a channel for receiving the at least one roller therein.

18. The door system according to claim 17, wherein the track further comprises a lip portion disposed on the pair of side walls for securing the at least one roller therein as the at least one roller traverses the track.

19. An aircraft comprising:
    a nacelle including a movable proprotor housing rotatable relative to a fixed portion of the nacelle from a forward flight mode to a vertical flight mode and a proprotor gearbox door connected to the movable proprotor housing and pivotably coupled to the fixed portion; and
    a door system coupled to the nacelle, the door system comprising:
        a linkage to pivotably couple the proprotor gearbox door and the fixed portion of the nacelle;
        a track assembly mounted to the movable proprotor housing; and
        a door roller mechanism connected to the proprotor gearbox door;
    wherein the door roller mechanism traverses the track assembly during rotation of the movable proprotor housing.

20. The aircraft according to claim 19, wherein the track assembly comprises at least one track supported by the movable proprotor housing.

21. The aircraft according to claim 19, wherein the door roller mechanism comprises at least one roller rotatably connected to a shaft associated with the proprotor gearbox door.

* * * * *